United States Patent
Xu et al.

(10) Patent No.: US 11,777,629 B2
(45) Date of Patent: Oct. 3, 2023

(54) REFERENCE TIME DETERMINING METHOD AND APPARATUS

(71) Applicant: HUAWEI TECHNOLOGIES CO., LTD., Shenzhen (CN)

(72) Inventors: Xiaoying Xu, Shanghai (CN); Qufang Huang, Shenzhen (CN); Qinghai Zeng, Shanghai (CN); Chong Lou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 185 days.

(21) Appl. No.: 17/213,576

(22) Filed: Mar. 26, 2021

(65) Prior Publication Data

US 2021/0218489 A1    Jul. 15, 2021

Related U.S. Application Data

(63) Continuation of application No. PCT/CN2019/107292, filed on Sep. 23, 2019.

(30) Foreign Application Priority Data

Sep. 27, 2018   (CN) .......................... 201811133717.8

(51) Int. Cl.
*H04J 3/06*   (2006.01)
*H04W 56/00*   (2009.01)

(52) U.S. Cl.
CPC .......... *H04J 3/0682* (2013.01); *H04J 3/0667* (2013.01); *H04W 56/004* (2013.01)

(58) Field of Classification Search
CPC ...... H04J 3/0635; H04J 3/0638; H04J 3/0647; H04J 3/065; H04J 3/0658; H04J 3/0667;
(Continued)

(56) References Cited

U.S. PATENT DOCUMENTS

| | | | | |
|---|---|---|---|---|
| 2005/0037786 A1* | 2/2005 | Edge | ................... | H04W 56/002 455/502 |
| 2012/0184285 A1* | 7/2012 | Sampath | ............. | H04W 56/004 455/456.1 |

(Continued)

FOREIGN PATENT DOCUMENTS

| | | |
|---|---|---|
| CN | 101350663 A | 1/2009 |
| CN | 101790230 A | 7/2010 |

(Continued)

OTHER PUBLICATIONS

3GPP TSG RAN WG1 Meeting #94,R1-1809346:"Discussion on time synchronization impact in physical layer", Huawei, China Southern Power Grid, HiSilicon,Gothenburg, Sweden, Aug. 20 24, 2018,total 10 pages.

(Continued)

*Primary Examiner* — Kevin D Mew
(74) *Attorney, Agent, or Firm* — Rimon PC

(57) ABSTRACT

A reference time determining method and apparatus are provided, to prevent aberrations in a control instruction execution time caused by inconsistency between a reference time of a terminal and a reference time of a control device in the conventional technology. In this application, the terminal may receive a plurality of pieces of time reference information sent by the network device. When the terminal receives indication information from the network device, the terminal may select, based on the indication information, one piece of time reference information from the plurality of pieces of time reference information as first time reference information. The indication information indicates the first time reference information. After determining the first time reference information, the terminal may determine the reference time of the terminal based on the first time reference information.

18 Claims, 15 Drawing Sheets

(58) Field of Classification Search
CPC ... H04J 3/0673; H04J 3/0682; H04W 56/001;
H04W 56/0015; H04W 56/004
See application file for complete search history.

(56) References Cited

U.S. PATENT DOCUMENTS

| | | | | |
|---|---|---|---|---|
| 2013/0244640 | A1* | 9/2013 | Viorel | H04W 56/0045 455/422.1 |
| 2013/0244653 | A1* | 9/2013 | Song | H04W 56/0015 455/436 |
| 2013/0272230 | A1* | 10/2013 | Dinan | H04W 74/004 370/329 |
| 2014/0023035 | A1* | 1/2014 | Zou | H04W 56/0045 370/350 |
| 2014/0194130 | A1* | 7/2014 | Khude | H04W 56/001 455/450 |
| 2016/0095074 | A1* | 3/2016 | Park | H04W 56/001 370/350 |
| 2016/0255671 | A1* | 9/2016 | Rahman | H04W 24/08 370/329 |
| 2016/0345179 | A1 | 11/2016 | Chen et al. | |
| 2017/0195110 | A1 | 7/2017 | Ruffini et al. | |
| 2017/0238298 | A1* | 8/2017 | Wang | H04W 72/51 455/452.1 |
| 2018/0077529 | A1* | 3/2018 | Ryu | H04W 64/006 |
| 2018/0343048 | A1* | 11/2018 | Radulescu | G01S 5/10 |
| 2018/0343056 | A1* | 11/2018 | Radulescu | H04B 7/2637 |
| 2019/0190635 | A1* | 6/2019 | Goel | H04J 3/0667 |

FOREIGN PATENT DOCUMENTS

| | | | | |
|---|---|---|---|---|
| CN | 102932880 | A | 2/2013 | |
| CN | 104581923 | A | 4/2015 | |
| CN | 106488550 | A | 3/2017 | |
| CN | 108011682 | A | 5/2018 | |
| EP | 1170884 | A2 * | 1/2002 | ........... H04B 7/2628 |
| EP | 3096570 | B1 * | 2/2019 | ........ H04W 56/0015 |
| WO | WO-2017134261 | A1 * | 8/2017 | ........ H04W 56/0015 |

OTHER PUBLICATIONS

3GPP TS 22.261 V16.5.0:"3rd Generation Partnership Project;Technical Specification Group Services and System Aspects;Service requirements for the 5G system;Stage 1(Release 16)",Sep. 2018,total 67 pages.

* cited by examiner

REFERENCE TIME DETERMINING METHOD AND APPARATUS

CROSS-REFERENCE TO RELATED APPLICATIONS

This application is a continuation of International Application No. PCT/CN2019/107292, filed on Sep. 23, 2019, which claims priority to Chinese Patent Application No. 201811133717.8, filed on Sep. 27, 2018. The disclosures of the aforementioned applications are hereby incorporated by reference in their entireties.

TECHNICAL FIELD

This application relates to the field of communications technologies, and in particular, to a reference time determining method and apparatus.

BACKGROUND

With the development of industrial automation, industrial robots are widely used in production lines to implement intelligent manufacturing. For example, a control device may send a control instruction to each industrial robot via a wireless network, so that each industrial robot can execute the control instruction at a preset moment to complete a specified action. However, in most intelligent manufacturing scenarios, a plurality of industrial robots need to work collaboratively to ensure that the plurality of industrial robots can jointly complete a unified action. For example, in a workshop scenario with industrial control, a plurality of industrial robots need to simultaneously act at a specific time to assemble a part, and the plurality of collaborative industrial robots need to perform some predefined actions at an absolute time point to cooperate with each other, to complete an entire assembly process. If any industrial robot has different understanding of time from the other robots, the initiation moment of an intermediate action may be incorrect. This may cause a failure in the assembly process, and even damage the part. Therefore, collaborative industrial robots need to be consistent in understanding of a time, and the collaborative industrial robots need to be synchronized to an absolute time. In other words, there is a time synchronization requirement between the robots.

Due to the advantages of a low delay and high reliability of wireless communications technologies, a network device in a wireless network can enable industrial robots to keep time synchronization with the network device. In this way, it can be ensured that the industrial robots are consistent in a reference time and kept consistent with the network device in the reference time. In a production system including an industrial robot, a network device, and a control device, a reference time of the network device may be different from a reference time of the control device, and a time offset exists between the reference time of the network device and the reference time of the control device. An action execution time in a control instruction sent by the control device is based on the reference time of the control device. After the control instruction is sent to the industrial robot by the network device, the industrial robot executes the control instruction based on a reference time synchronized with the reference time of the network device. As a result, the industrial robot may not execute the control instruction at the right time, causing deviations in the control instruction execution time.

In conclusion, in an existing production system, inconsistency between the reference time of a terminal and the reference time of a control device causes errors in the control instruction execution time.

SUMMARY

This application provides a reference time determining method and apparatus, to resolve a difference in a control instruction execution time caused by inconsistency between a reference time of a terminal and a reference time of a control device in the conventional technology.

According to a first aspect, an embodiment of this application provides a reference time determining method. The method may be applied to a terminal, or may be applied to a chip inside the terminal. In the method, the terminal may receive a plurality of pieces of time reference information sent by a network device. The terminal receives indication information from the network device, and the terminal may select a piece of time reference information from the plurality of pieces of time reference information as first time reference information based on the indication information, where the indication information is used to indicate the first time reference information. The terminal may determine a reference time of the terminal based on the first time reference information after determining the first time reference information.

It can be learned that, in the first aspect, the terminal may determine the first time reference information from the plurality of pieces of received time reference information based on the indication information from the network device, and then may determine the reference time of the terminal based on the first time reference information, so that the reference time of the terminal is consistent with a reference time of a control device, thereby reducing a time difference between the instruction execution time determined by the terminal and the instruction execution time expected by the control device.

In a possible design, one of the plurality of pieces of time reference information may indicate a reference time of at least one control device. Correspondingly, the plurality of pieces of time reference information includes the first time reference information, and the first time reference information indicates a reference time of a first control device. In the method, the terminal may determine the reference time of the at least one control device by using the time reference information, so that the reference time of the terminal can be the same as the reference time of the control device.

In a possible design, the time reference information may indicate the reference time of the control device by using a carried information element. For example, the time reference information may include a reference time information element and an identification information element. The reference time information element may carry a specific time value of the reference time of the control device. The identification information element may include some or all pieces of the following information: device information of the control device, identification information of a clock, or an index of the time reference information. In the method, the time reference information may flexibly and conveniently indicate the reference time of the at least one control device by using the carried information element.

In a possible design, time reference information in the plurality of pieces of time reference information may alternatively indicate a time offset between reference time of a control device and reference time of the network device. Correspondingly, the plurality of pieces of time reference information include the first time reference information, and the first time reference information indicates a time offset between the reference time of a first control device and the reference time of the network device. In the method, the terminal may determine the time offset between the reference time of the at least one control device and the reference time of the network device by using the time reference information, so that the reference time of the terminal can be the same as the reference time of the control device.

In a possible design, the terminal may further receive time reference information of the network device from the network device, where the time reference information of the network device indicates the reference time of the network device.

In a possible design, when the time reference information in the plurality of pieces of time reference information may alternatively indicate the time offset between the reference time of the control device and the reference time of the network device, the terminal may determine the reference time of the terminal based on the first time reference information and the time reference information of the network device. In the method, the terminal may conveniently and quickly determine the reference time of the terminal by using a sum of the time offset between the reference time of the first control device and the reference time of the network device and the reference time of the network device.

In a possible design, the time reference information may indicate the time offset between the reference time of the control device and the reference time of the network device by using a carried information element. For example, the time reference information may include a time offset information element and an identification information element. The time offset information element may carry a specific time value of the time offset. The identification information element may include some or all pieces of the following information: device information of the control device, identification information of a clock, or an index of the time reference information. In the method, the time reference information may flexibly and conveniently indicate the time offset between the reference time of the at least one control device and the reference time of the network device by using the carried information element.

In a possible design, the plurality of pieces of time reference information and the indication information may be separately placed in different messages, or may be carried in one message.

In a possible design, when indicating the first time reference information, the indication information may include some or all pieces of the following information: device information of the first control device, identification information of a first clock, or an index of the first time reference information, where the first clock is a clock of the first control device.

According to a second aspect, an embodiment of this application provides a reference time determining method. The method may be applied to a terminal, or may be applied to a chip inside the terminal. The method includes: The terminal may first obtain first time reference information, where the first time reference information does not indicate a reference time of a network device. After obtaining the first time reference information, the terminal may determine a reference time of the terminal based on a first reference time indicated by the first time reference information.

It can be learned that, in the second aspect, the terminal may self-determine the reference time of the terminal based on the first time reference information after obtaining the first time reference information, so that the reference time of the terminal can be kept consistent with the time indicated by the first time reference information, thereby reducing a time difference between an instruction execution time determined by the terminal and the time expected by a control device.

In a possible design, when obtaining the first time reference information, the terminal may receive only the first time reference information from the network device, or a plurality of pieces of time reference information from the network device, and then select a piece of time reference information from the plurality of pieces of time reference information as the first time reference information. In other words, the plurality of pieces of time reference information includes the first time reference information. In the method, the terminal may conveniently and flexibly self-determine the first time reference information from the plurality of pieces of time reference information, so that the terminal can relatively efficiently determine the reference time of the terminal based on the first time reference information.

In a possible design, the terminal may alternatively receive indication information from the network device, where the indication information indicates the first time reference information. When the terminal receives the plurality of pieces of time reference information from the network device, the terminal may determine the first time reference information based on the indication information.

In a possible design, the first time reference information may indicate a reference time of a first control device. When the terminal receives the plurality of pieces of time reference information from the network device, one of the plurality of pieces of time reference information may indicate a reference time of at least one control device. Correspondingly, the plurality of pieces of time reference information includes the first time reference information.

In a possible design, the first time reference information may indicate the reference time of the first control device by using a carried information element. For example, the first time reference information may include a reference time information element and an identification information element. The reference time information element may carry a specific time value of the reference time of the first control device. The identification information element may include some or all pieces of the following information: device information of the first control device, identification information of a first clock, or an index of the first time reference information. In the method, the first time reference information may relatively flexibly and conveniently indicate the reference time of the first control device by using the carried information element.

In a possible design, the first time reference information may indicate a time offset between a reference time of a first control device and the reference time of the network device. When the terminal receives the plurality of pieces of time reference information from the network device, time reference information in the plurality of pieces of time reference information may alternatively indicate a time offset between the reference time of a control device and the reference time of the network device. Correspondingly, the plurality of pieces of time reference information includes the first time reference information.

In a possible design, the first time reference information may indicate the time offset between the reference time of the first control device and the reference time of the network device by using a carried information element. For example, the first time reference information may include a time offset information element and an identification information element. The time offset information element may carry a specific time value of the time offset between the reference time of the first control device and the reference time of the network device. The identification information element may include some or all pieces of the following information: device information of the first control device, identification information of a first clock, or an index of the first time reference information. In the method, the first time reference information may flexibly and conveniently indicate the time offset between the reference time of the first control device and the reference time of the network device by using the carried information element.

In a possible design, the terminal may further receive time reference information of the network device from the network device, where the time reference information of the network device indicates the reference time of the network device.

In a possible design, when the first time reference information indicates the time offset between the reference time of the first control device and the reference time of the network device, the terminal may determine the reference time of the terminal based on the first time reference information and the time reference information of the network device. In the method, the terminal may conveniently and quickly determine the reference time of the terminal by using a sum of the time offset between the reference time of the first control device and the reference time of the network device and the reference time of the network device.

In a possible design, the plurality of pieces of time reference information and the indication information may be separately placed in different messages, or may be carried in one message.

In a possible design, when indicating the first time reference information, the indication information may include some or all pieces of the following information: the device information of the first control device, the identification information of the first clock, or the index of the first time reference information, where the first clock is a clock of the first control device.

In a possible design, when indicating the first time reference information, the indication information may include some or all pieces of the following information: the device information of the first control device, the identification information of the first clock, or the index of the first time reference information, where the first clock is a clock of the first control device.

According to a third aspect, an embodiment of this application provides a reference time determining method. The method may be applied to a network device, or may be applied to a chip inside the network device. In the method, the network device first determines a time offset, where the time offset represents a time difference between a reference time of a control device and a reference time of the network device. If the network device receives a data packet from the control device and the data packet carries a timestamp, the network device may correct the timestamp based on the time offset. The network device then sends, to a terminal, a data packet that carries a corrected timestamp.

It can be learned that, in the third aspect, the network device may correct the timestamp in the data packet from the control device based on the time offset, so that the terminal can correctly parse the corrected timestamp based on a reference time of the terminal when the terminal receives the data packet, thereby effectively reducing the difference between the actual instruction execution time and the time expected by the control device.

According to a fourth aspect, this application provides a reference time determining apparatus, including units or means used to perform the steps in the first aspect, the second aspect, or the third aspect.

According to a fifth aspect, this application provides a reference time determining apparatus, including at least one processor configured to be connected to a memory, and read and execute a program in the memory to perform the method according to the first aspect, the second aspect, or the third aspect.

According to a sixth aspect, this application provides a reference time determining apparatus, including at least one processor and an interface circuit. The at least one processor communicates with another apparatus by using the interface circuit, and is configured to perform the method according to the first aspect, the second aspect, or the third aspect.

According to a seventh aspect, this application provides a reference time determining program. When the program is executed by a processor, the program is used to perform the method according to the first aspect, the second aspect, or the third aspect.

According to an eighth aspect, a program product such as a computer-readable storage medium is provided. The program product includes the program according to the seventh aspect.

DESCRIPTION OF EMBODIMENTS

Figure 1:
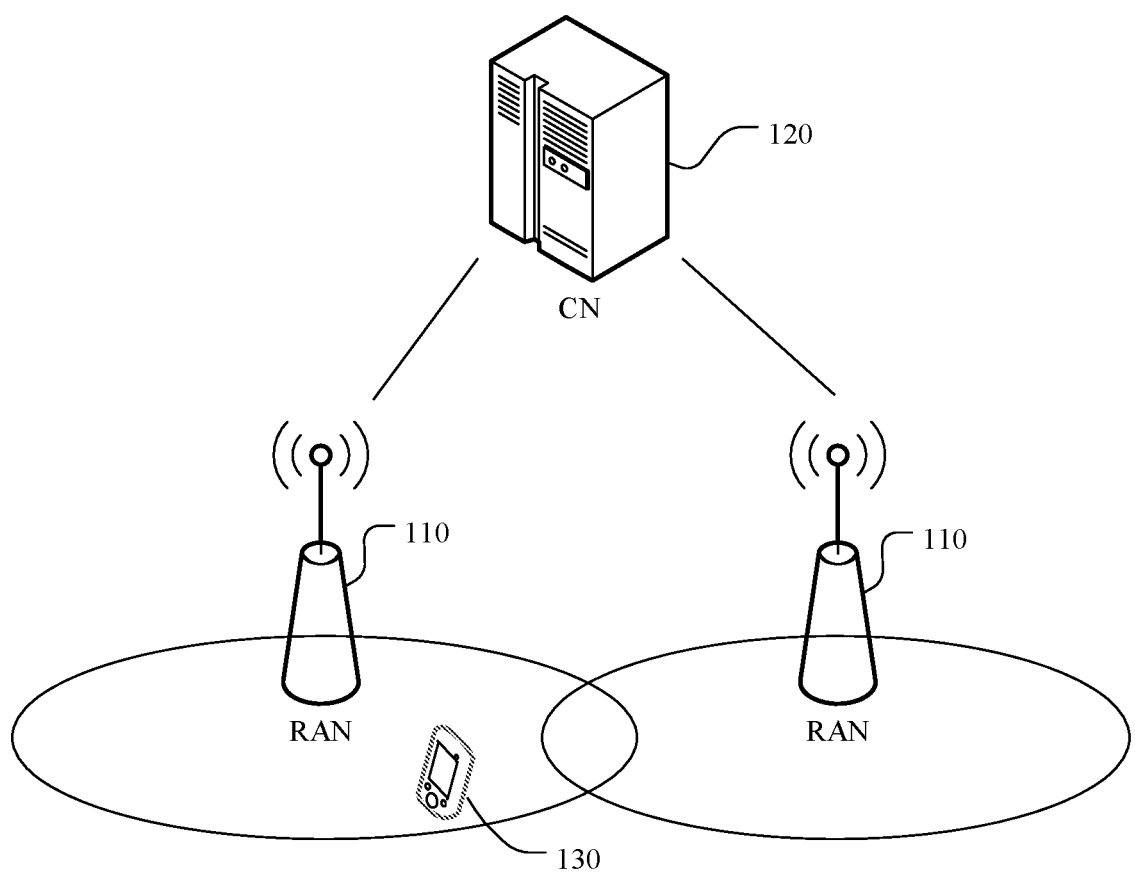
FIG. 1 is a schematic diagram of a communications system according to an embodiment of this application.

Some terms in this application are first described, to help a person skilled in the art have a better understanding.

1. A terminal is also referred to as user equipment (UE), a mobile station (MS), a mobile terminal (MT), or the like, and is a device that provides voice/data connectivity to a user, for example, a handheld device or a vehicle-mounted device that has a wireless connection function. Currently, some examples of the terminal are a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, and the like.

2. A network device is a device in a wireless network, for example, a radio access network (RAN) node that enables the terminal to access the wireless network. Currently, some examples of the RAN node are a gNB, a transmission reception point (TRP), an evolved Node B (eNB), a radio network controller (RNC), a Node B (NB), a base station controller (BSC), a base transceiver station (BTS), a home base station (for example, a home evolved Node B, or a home Node B, HNB), a baseband unit (BBU), a wireless fidelity (Wifi) access point (AP), and the like. In a network structure, the network device may include a centralized unit (CU) node, a distributed unit (DU) node, or a RAN device including a CU node and a DU node. For another example, the network device may be a core network (CN) device that provides service support to the terminal. Common core network devices include an access and mobility management function (AMF) entity, a session management function (SMF) entity, a user plane function (UPF) entity, and the like, which are not enumerated herein.

The AMF entity is responsible for access management and mobility management of the terminal. The SMF entity is responsible for session management, such as session establishment of a user. The UPF entity is a functional entity on a user plane, and is mainly responsible for connection to an external network.

The RAN device and the CN device each can be used as the network device to perform the method performed by the network device in the embodiments of this application.

3. "A plurality of" means two or more, and other quantifiers are similar to this. The term "and/or" describes an association relationship for describing associated objects and represents that three relationships may exist. For example, A and/or B may represent the following three cases: Only A exists, both A and B exist, and only B exists.

4. A control device is a device that communicates with the terminal by using the wireless network. The control device may be a programmable logic controller (PLC). The control device may send a data packet to the terminal by using the wireless network. For example, the data packet may include an action execution instruction and a timestamp. The timestamp is used to indicate action execution time. The action execution time may be accurate to year, month, day, hour, minute, and second. In other words, the action execution time may be accurate to a moment on a day. A specific indication manner is not limited in the embodiments of this application.

5. Time reference information: In the embodiments of this application, there may be two types of time reference information. One type is time reference information used to indicate a reference time of the control device, and the other type is time reference information used to indicate a time offset between a reference time of the control device and a reference time of the network device. A specific indication manner may be carrying an information element, for example, a reference time information element or a time offset information element. The reference time information element indicates the reference time of the control device, and the time offset information element indicates the time offset between the reference time of the control device and the reference time of the network device.

One piece of time reference information corresponds to a reference time of one control device or a time offset between a reference time of one control device and the reference time of the network device. When a plurality of control devices exists, a plurality of pieces of time reference information exists, and each piece of time reference information corresponds to a reference time of one of the control devices or a time offset between a reference time of one of the control devices and the reference time of the network device. Alternatively, one piece of time reference information may correspond to reference times of more than one control device or a time offset between reference times of more than one control device and the reference time of the network device, and these control devices have a same reference time.

It should be noted that, a time concept (for example, the reference time of the control device, the reference time of the network device, or a reference time of the terminal) in the embodiments of this application is a moment in time measured in a time unit of year, month, day, hour, minute, and second, and even a smaller time unit.

6. Reference time and clock: Concepts of the reference time and clock are not distinguished from each other in the embodiments of this application. The reference time and clock may be considered as equivalent concepts. The reference time of the control device is used as an example to describe a concept of the reference time. The reference time of the control device is a time reference for executing an action or determining a timestamp by the control device, and is a time measurement reference of the control device. Different devices have different reference times. For example, the reference time of the control device may be different from the reference time of the network device. For example, if a current moment needs to be recorded, a moment recorded based on the reference time of the control device may be different from a moment recorded based on the reference time of the network device. Similarly, for example, a moment recorded based on Beijing time is different from a moment recorded based on London time. A difference in a reference time may be a difference in time precision. For example, the precision of the reference time of the control device is 1 microsecond, and the precision of the reference time provided by the network device is 1 ms. The difference in reference time precision may be caused by a difference in precision of time provided from different clock sources.

Because the terminal keeps its time synchronized with the wireless network, the reference time of the terminal is consistent with the reference time of the network device. For example, the terminal determines the reference time of the terminal based on time reference information sent by the network device.

7. Time offset: In the embodiments of this application, when two devices have different reference times, a difference exists between the reference times of the two devices. The difference is referred to as a time offset, and the time offset may a time period. The time offset in the embodiments of this application is a time offset between the reference time of the control device and the reference time of the network device. A value obtained by subtracting the reference time of the network device from the reference time of the control device is the time offset. The time offset may be a positive value, indicating that the reference time of the control device is faster than the reference time of the network device, or the time offset may be a negative value, indicating that the reference time of the control device is slower than the reference time of the network device. Alternatively, the time offset between the reference time of the control device and the reference time of the network device may be a value obtained by subtracting the reference time of the control device from the reference time of the network device. The time offset may be a negative value, indicating that the reference time of the control device is faster than the reference time of the network device, or the time offset may be a positive value, indicating that the reference time of the control device is slower than the reference time of the network device.

8. Time precision: The time precision may indicate a minimum time unit. For example, the time precision is second, microsecond, or millisecond. Time with different time precision may be different, which is embodied by a difference in minimum time units. In the embodiments of this application, relatively low time precision is a relatively large minimum time unit and represents time at a coarse granularity, and relatively high time precision is a relatively small minimum time unit and represents time at a fine granularity.

To make objectives, technical solutions, and advantages of this application clearer, the following further describes this application in detail with reference to the accompanying drawings.

FIG. 1 is a schematic diagram of a communications system according to an embodiment of this application. A terminal 130 accesses a wireless network, to obtain a service from an external network (for example, the Internet) by using the wireless network, or communicate with another device, for example, communicate with a control device, by using the wireless network. The wireless network includes a RAN 110 and a CN 120. The RAN 110 is used to enable the terminal 130 to access the wireless network. The CN 120 is used to manage the terminal and provide a gateway that communicates with the external network.

The CN 120 may include a plurality of CN devices, for example, an AMF entity, a UPF entity, or an SMF entity. Alternatively, the CN 120 may include a mobility management entity (MME) and a serving gateway (S-GW).

Although not shown, the communications system shown in FIG. 1 may further include a control device, and the control device may send a data packet to the terminal 130 by using the RAN 110 and the CN 120 in the wireless network.

Figure 2A:
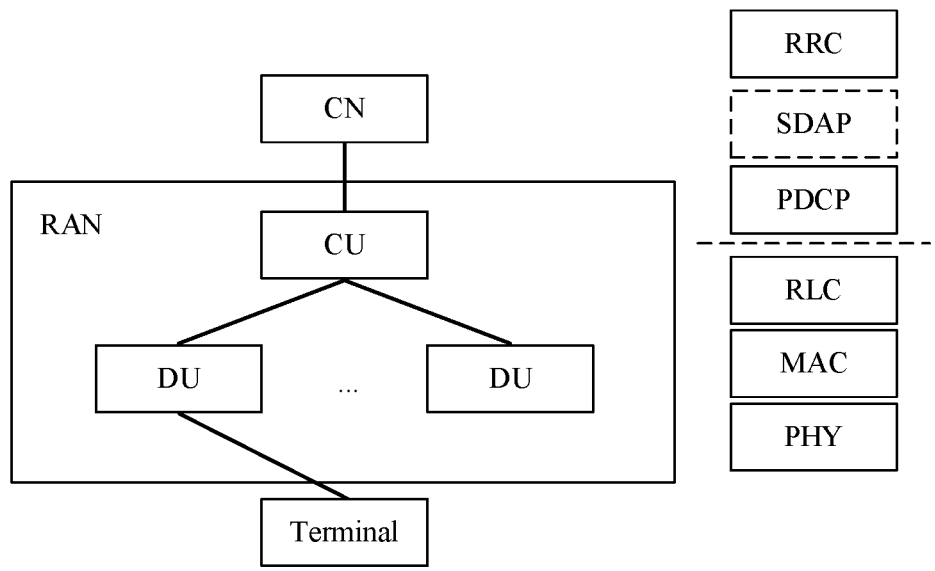
FIG. 2A is a schematic diagram of a network architecture according to an embodiment of this application.

FIG. 2A is a schematic diagram of a network architecture according to an embodiment of this application. As shown in FIG. 2A, the network architecture includes a CN device and a RAN device. The RAN device includes a baseband apparatus and a radio frequency apparatus. The baseband apparatus may be implemented by using one node, or may be implemented by using a plurality of nodes. The radio frequency apparatus may be remote from the baseband apparatus to be implemented independently, or may be integrated into the baseband apparatus, or may be partially remote from the baseband apparatus and partially integrated into the baseband apparatus. For example, in a long term evolution (LTE) communications system, a RAN device (an eNB) includes a baseband apparatus and a radio frequency apparatus. The radio frequency apparatus may be arranged remotely from the baseband apparatus. For example, a remote radio unit (RRU) is arranged remotely from a BBU.

Communication between the RAN device and a terminal complies with a specific protocol layer structure. For example, a control-plane protocol layer structure may include functions of protocol layers such as a radio resource control (RRC) layer, a packet data convergence protocol (PDCP) layer, a radio link control (RLC) layer, a media access control (MAC) layer, and a physical layer. A user-plane protocol layer structure may include functions of protocol layers such as the PDCP layer, the RLC layer, the MAC layer, and the physical layer. In an implementation, a service data adaptation protocol (SDAP) layer may be further included above the PDCP layer.

The RAN device may implement functions of protocol layers such as the radio resource control (RRC) layer, the packet data convergence protocol (PDCP) layer, the radio link control (RLC) layer, and the media access control (MAC) layer by using one node, or may implement the functions of these protocol layers by using a plurality of nodes. For example, in an evolved structure, the RAN device may include a centralized unit (CU) and a distributed unit (DU), and a plurality of DUs may be centrally controlled by one CU. As shown in FIG. 2A, the CU and the DU may be obtained through division based on protocol layers of a wireless network. For example, functions of the PDCP layer and protocol layers above the PDCP layer are set in the CU, and functions of protocol layers below the PDCP layer, for example, the RLC layer and the MAC layer, are set in the DU.

This protocol layer division is only an example. Alternatively, the division may be performed based on another protocol layer, for example, the RLC layer, so that functions of the RLC layer and protocol layers above the RLC layer are set in the CU, and functions of protocol layers below the RLC layer are set in the DU. Alternatively, the division may be performed in a protocol layer, for example, some functions of the RLC layer and functions of protocol layers above the RLC layer are set in the CU, and a remaining function of the RLC layer and functions of protocol layers below the RLC layer are set in the DU. In addition, the division may alternatively be performed in another manner, for example, based on a delay, so that a function whose processing time needs to meet a delay requirement is set in the DU, and a function whose processing time does not need to meet the delay requirement is set in the CU.

In addition, the radio frequency apparatus may be remote and not placed in the DU, or may be integrated into the DU, or may be partially remote and partially integrated into the DU. This is not limited herein.

Figure 2B:
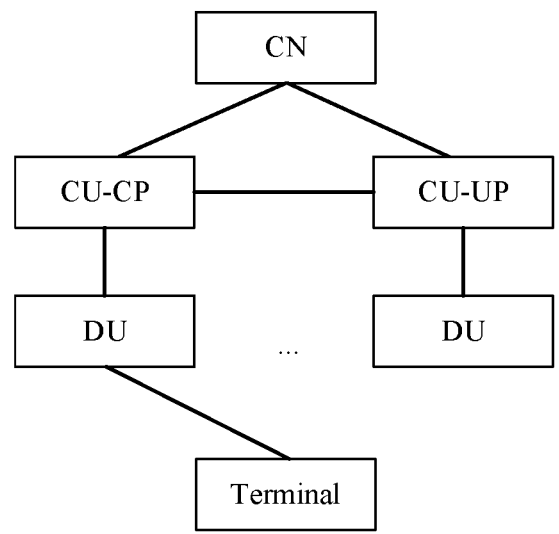
FIG. 2B is a schematic diagram of another network architecture according to an embodiment of this application.

Continuing to refer to FIG. 2B, compared with the architecture shown in FIG. 2A, alternatively, a control plane (CP) and a user plane (UP) of the CU may be separated from each other, so that the CU is implemented by being divided into different entities: a CU control-plane entity (CU-CP entity) and a CU user-plane entity (CU-UP entity).

In the foregoing network architecture, signaling generated by the CU may be sent to the terminal by using the DU, or signaling generated by the terminal may be sent to the CU by using the DU. The DU may not parse the signaling, but directly encapsulate the signaling by using a protocol layer and then transparently transmit encapsulated signaling to the terminal or the CU. If this type of signaling transmission between the DU and the terminal is involved in the following embodiments, this scenario is included in sending or receiving signaling by the DU. For example, signaling at the RRC or PDCP layer is finally processed into signaling at the PHY layer and the signaling at the PHY layer is sent to the terminal; or is converted from received signaling at the PHY layer. In this architecture, it may be considered that the signaling at the RRC or PDCP layer is sent by the DU, or sent by the DU and the radio frequency apparatus.

In the foregoing embodiment, the CU is classified as a network device on a RAN side. In addition, the CU may alternatively be classified as a network device on a CN side. This is not limited herein.

The apparatus in the following embodiments of this application may be located in the terminal or the network device based on a function implemented by the apparatus. When the foregoing CU-DU structure is used, the network device may be a CU node, a DU node, or a RAN device including a CU node and a DU node.

The communications system shown in FIG. 1 is used as an example. When the control device needs to send a data packet to the terminal, the control device first sends the data packet to a RAN device, and then the RAN device forwards the data packet to the terminal. The data packet sent by the control device includes a timestamp, and the timestamp is used to indicate a specific time. For example, the data packet may be a control instruction. In this case, the timestamp in the data packet is used to represent a control instruction execution time. However, the timestamp in the data packet is set based on a reference time of the control device. After the terminal receives the data packet, the terminal parses the timestamp in the data packet based on reference time of the terminal. If the reference time of the terminal is inconsistent with the reference time of the control device, an error exists in parsing the timestamp in the data packet by the terminal. In other words, a control instruction execution time is earlier or later than the time expected by the control device. As a result, the terminal cannot execute the control instruction as expected by the control device. In addition, in specific implementation, the terminal actually receives a plurality of data packets from different control devices. In other words, the terminal is controlled by a plurality of different control devices. Based on all existing manners of parsing a timestamp in a data packet by a terminal, the terminal parses a timestamp in a data packet based on a reference time of the terminal. However, different control devices usually have different reference times, and the reference times of the different control devices are not necessarily the same as the reference time of the terminal. As a result, an error exists in parsing a timestamp in a data packet from each of different control devices by the terminal.

When the terminal is synchronized with the RAN device in the wireless network in terms of time, the reference time of the terminal is kept consistent with a reference time of the RAN device. Optionally, devices (for example, the RAN device and the CN device) in the wireless network are also consistent in reference times.

To keep a reference time of a terminal consistent with a reference time of a control device to minimize a problem that inconsistency between the reference time of the terminal and the reference time of the control device causes a difference in an instruction execution time, this application provides a reference time determining method, specifically including the following three possible implementations:

In a first possible implementation, a network device sends, to the terminal, time reference information used to indicate the reference time of the control device, and the terminal may determine the reference time of the terminal based on the reference time of the control device after receiving the time reference information used to indicate the reference time of the control device.

In this manner, a quantity of pieces of time reference information is not limited. When a plurality of control devices exist, a plurality of pieces of corresponding time reference information exist, and each piece of time reference information represents a reference time of one of the control devices. The network device may send a plurality of pieces of time reference information to the terminal. After receiving the plurality of pieces of time reference information, the terminal may determine one piece of time reference information from the plurality of pieces of time reference information (in this embodiment of this application, first time reference information is used to represent the time reference information determined by the terminal from the plurality of pieces of time reference information), and determine the reference time of the terminal based on the determined time reference information; or may determine first time reference information from the plurality of pieces of time reference information based on indication information from the network device, and determine the reference time of the terminal based on the first time reference information.

In this manner, the terminal may receive one or more pieces of time reference information and determine the first time reference information based on the one or more pieces of received time reference information, and then may determine the reference time of the terminal based on the first time reference information, so that the reference time of the terminal can be consistent with the reference time of the control device, and then an instruction execution time can be consistent with a time expected by the control device.

In a second possible implementation, a network device sends, to the terminal, time reference information used to indicate a time offset between the reference time of the control device and a reference time of the network device. After receiving the time reference information used to indicate the time offset between the reference time of the control device and the reference time of the network device, the terminal may correct, based on the time offset indicated by the time reference information, the reference time provided by the network device, and then determine the reference time of the terminal.

In this manner, a quantity of pieces of time reference information is not limited. When a plurality of control devices exist, a plurality of pieces of corresponding time reference information exist, and each piece of time reference information represents a time offset between a reference time of one of the control devices and the reference time of the network device. The network device may send a plurality of pieces of time reference information to the terminal. After receiving the plurality of pieces of time reference information, the terminal may determine one piece of time reference information from the plurality of pieces of time reference information (in this embodiment of this application, first time reference information is used to represent the time reference information determined by the terminal from the plurality of pieces of time reference information), and determine the reference time of the terminal based on the first time reference information; or may determine first time reference information from the plurality of pieces of time reference information based on indication information from the network device, and determine the reference time of the terminal based on the first time reference information.

In this manner, the terminal may receive one or more pieces of time reference information and determine the first time reference information based on the one or more pieces of received time reference information, and then may determine the reference time of the terminal based on the first time reference information. In other words, the terminal may enable the reference time of the terminal to be consistent with the reference time of the control device by using the time offset between the reference time of the control device and the reference time of the network device, and then may enable the terminal to be synchronized with the control device in terms of time, so that instruction execution accuracy can be improved.

In a third possible implementation, before forwarding a data packet from the control device to the terminal, a network device may correct a timestamp in the data packet based on a time offset between the reference time of the control device and a reference time of the network device, and then send, to the terminal, a data packet that carries a corrected timestamp.

In this manner, the network device may correct the timestamp in the data packet from the control device based on the time offset, so that the terminal can correctly parse the corrected timestamp based on the reference time of the terminal when the terminal receives the data packet, thereby improving precision of an instruction execution time.

The following specifically describes the three manners provided in the embodiments of this application with reference to the accompanying drawings.

The first possible implementation may specifically include two cases: Case 1: The network device sends a plurality of pieces of time reference information to the terminal. Case 2: The network device sends one piece of time reference information to the terminal. The time reference information is used to represent a reference time of a control device. One piece of time reference information may represent a reference time of one control device, or one piece of time reference information may represent reference times of more than one control device. When one piece of time reference information represents reference times of more than one control device, these control devices have a same reference time. The following separately describes the two cases in the first possible implementation.

Figure 3:
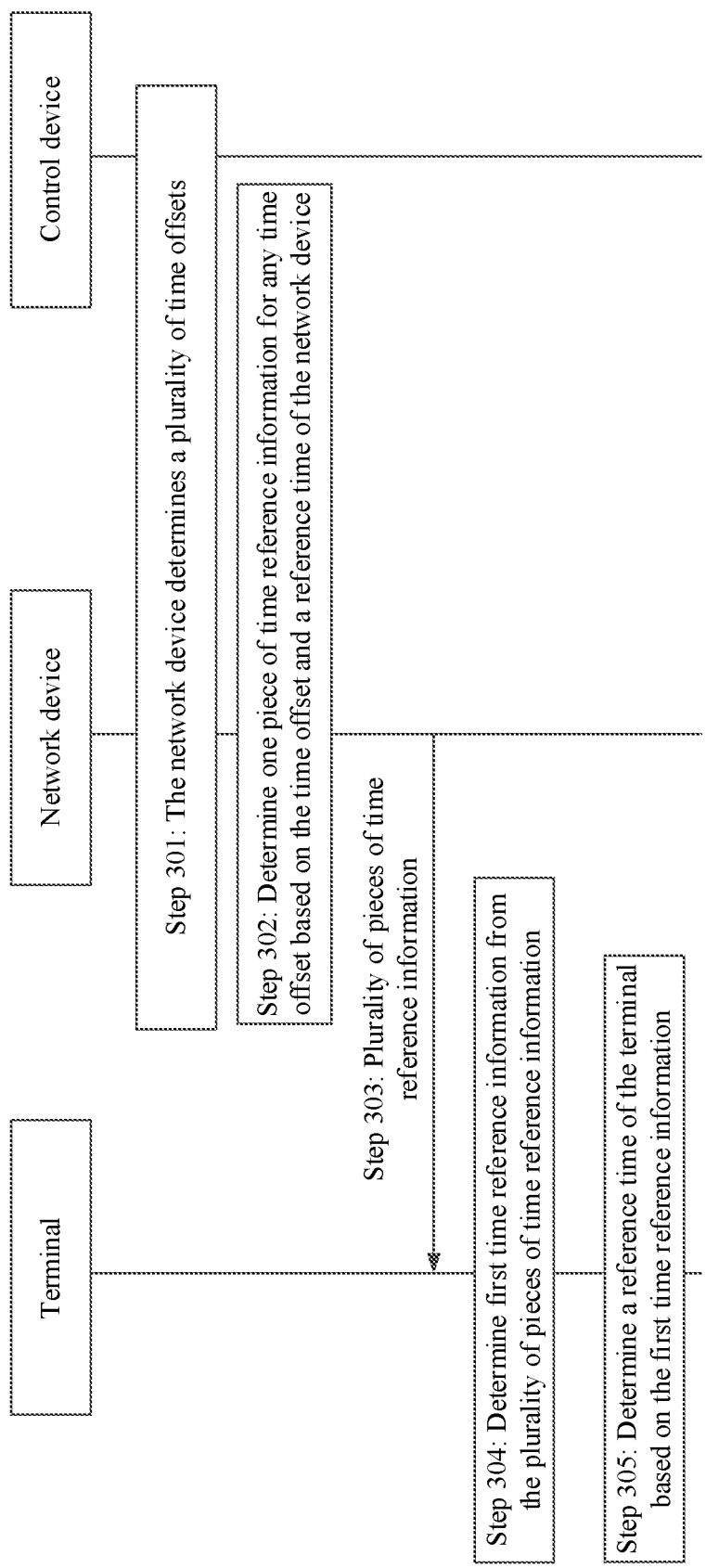
FIG. 3 to FIG. 9 are schematic diagrams of a reference time determining method according to this application.

Case 1: FIG. 3 shows a reference time determining method according to an embodiment of this application. The method includes the following steps:

Step 301: A network device determines a plurality of time offsets, where each time offset represents a time difference between a reference time of at least one control device and a reference time of the network device.

Each control device communicates with, for example, sends a data packet to, a terminal by using the network device. Therefore, a plurality of control devices exist. When a plurality of control devices exist, the network device may determine one time offset for any control device, where the time offset is a time difference between a reference time of the control device and the reference time of the network device.

The network device may be capable of determining a time offset. In other words, the network device may determine the plurality of time offsets. Alternatively, the network device may determine the plurality of time offsets by using another network device.

For example, when the network device is a RAN device, the RAN device may determine the plurality of time offsets. Alternatively, the RAN device may determine the plurality of time offsets by using a CN device (for example, an AMF entity or a UPF entity); that is, the CN device sends the plurality of time offsets to the network device after determining the plurality of time offsets.

Regardless of whether the RAN device determines the plurality of time offsets or the core network device determines the plurality of time offsets, any time offset may be determined in many time offset determining manners. The following describes one of the time offset determining manners:

If a clock of the network device is different from a clock of a control device, the network device may determine a time offset with the control device in an information exchange manner.

For example, the clock of the control device is a master clock, and the clock of the network device a slave clock.

The control device sends a first synchronization message to the network device. The control device sends the first synchronization message at a moment T1, and T1 is a time that is based on the master clock.

The network device receives the first synchronization message from the control device. The network device receives the first synchronization message at a moment T2, and T2 is a moment that is based on the slave clock.

The network device sends a second synchronization message to the control device. The network device sends the second synchronization message at a moment T3, and T3 is a time that is based on the slave clock.

The control device receives the second synchronization message from the network device. The control device receives the second synchronization message at a moment T4, and T4 is a time that is based on the master clock.

Specifically, the time offset is offset, and a delay of message exchange between the control device and the network device is delay. In this case, T1, T2, T3, T4, offset, and delay have the following relationship:

$$T2=T1+\text{offset}+\text{delay}$$

$$T4=T3-\text{offset}+\text{delay}$$

The time offset may be calculated according to the following formula: Offset=[(T2−T1)+(T3−T4)]/2.

The foregoing time offset determining manner is merely an example for description. Actually, there are many time offset determining manners. The time offset determining manner is not limited in this application. Any manner in which the time offset can be determined is applicable to this embodiment of this application.

Optionally, if a time offset also exists between the CN device and the network device, the network device interacts with the CN device to obtain the time offset between the network device and the CN device. The network device corrects the plurality of time offsets based on the time offset between the network device and the CN device after receiving the plurality of time offsets sent by the CN device.

The network device performs step 302 after determining the plurality of time offsets.

Step 302: The network device determines one piece of time reference information for any time offset based on the time offset and the reference time of the network device, where the time reference information is used to represent a reference time of at least one control device.

For any time offset, a difference between the reference time of the network device and the time offset is a reference time of at least one control device. In other words, the reference time of the control device is equal to the reference time of the network device minus the time offset. After each time determining one time offset, the network device may determine one piece of time reference information. The time reference information is used to represent a reference time of at least one control device. For example, one piece of time reference information represents a reference time of one control device. Because the plurality of time offsets exist, the network device may determine reference times of a plurality of control devices by using the plurality of time offsets and the reference time of the network device. Correspondingly, the network device may determine a plurality of pieces of time reference information, where any time reference information may indicate a reference time of one control device. In other words, one piece of time reference information corresponds to a reference time of one control device.

Table 1 shows a message combination manner in which the network device sends the plurality of pieces of time reference information. The network device may combine the plurality of pieces of time reference information into one list and add the list to one message for sending. The multi information element in the message may represent a quantity of pieces of time reference information. Then, each piece of time reference information is described. For example, the time reference 1 is the first piece of time reference information and may represent the time reference information of the control device 1, where the message may not indicate the control device 1, but directly carry a reference time of the control device 1; the time reference 2 is the second time reference information and may represent the time reference information of the control device 2 and the control device 3, where the message may not indicate the control device 2 or the control device 3, but directly carry reference times of the control device 2 and the control device 3; and the time reference 3 is the third time reference information and may represent the time reference information of the control device 4, where the message may not indicate the control device 4, but directly carry a value of a reference time of the control device 4.

TABLE 1

| Information element/<br>Group name | Multi | Semantics description |
| --- | --- | --- |
| Time reference information list | 1 to N | N is greater than or equal to 1 |
| Time reference 1 | | Time reference information of a control device 1 |
| Time reference 2 | | Time reference information of a control device 2 and a control device 3 |
| Time reference 3 | | Time reference information of a control device 4 |

Specifically, the time reference information may include a reference time information element, and the reference time information element may indicate a reference time of at least one control device. Because the network device determines the plurality of pieces of time reference information, to distinguish between different time reference information, the time reference information may further include an identification information element.

The identification information element may include some or all pieces of the following information:

device information of the control device, identification information of a clock, an index of the time reference information, or time precision information.

Specifically, the time reference information may include the reference time information element, and the reference time information element may indicate the reference time of the at least one control device. Because the network device determines the plurality of pieces of time reference information, to distinguish between time precision of different time reference information, the identification information element may further include the time precision information.

Table 2 shows a message combination manner in which the network device sends the plurality of pieces of time reference information. The network device may combine the plurality of pieces of time reference information into one list and add the list to one message. The multi information element in the message may represent a quantity of pieces of time reference information. Then, each piece of time reference information is described. For example, the time reference 1 is a reference time information element of the first piece of time reference information and is used to represent the reference time of the control device 1, and the identification information element 1 is an identification information element of the first piece of time reference information; the time reference 2 is a reference time information element of the second piece of time reference information and is used to represent the reference time of the control device 2 and the control device 3, and the identification information element 2 is an identification information element of the second piece of time reference information; and the time reference 3 is a reference time information element of the third piece of time reference information and is used to represent the reference time of the control device 4, and the identification information element 3 is an identification information element of the third piece of time reference information.

When different control devices have a same reference time, reference times of different control devices may be represented by using one piece of time reference information, and an identification information element in the time reference information may identify different control devices. For example, the time reference 2 and the identification information element 2 in Table 2 may jointly represent time reference information of the control device 2 and the control device 3.

In a possible implementation, when receiving time reference information, the terminal may further receive a reference system frame number (SFN) corresponding to the time reference information. The SFN corresponding to the time reference information may indicate that a reference time indicated by the time reference information is a specific time of a time node corresponding to the SFN.

The network device may add the time reference information to a system message and send the system message to the terminal in a broadcast manner. The terminal receives the system message. If the system message does not indicate the reference system frame number corresponding to the time reference information, the reference system frame number corresponding to the time reference information may be an end boundary of a system information window to which the system message belongs or a reference system frame number after the end boundary.

TABLE 2

| Information element/<br>Group name | Multi | Semantics description |
| --- | --- | --- |
| Time reference information list | 1 to N | N is greater than or equal to 1 |
| Identification information element 1 | | |
| Time reference 1 | | Reference time of a control device 1 |
| Identification information element 2 | | |
| Time reference 2 | | Reference time of a control device 2 and a control device 3 |
| Identification information element 3 | | |
| Time reference 3 | | Reference time of a control device 4 |

Specifically, the time reference information may include a reference time information element, and the reference time information element may indicate a reference time of at least one control device.

Different terminals have different time precision requirements for reference times of the terminals. For example, some terminals require that reference times of the terminals are accurate to microsecond, and some terminals require that reference times of the terminals are accurate only to a second.

To enable the time reference information to meet precision requirements of different terminals for reference times of the terminals, the time reference information may be determined in the following two manners.

Manner 1: Because a reference time of one control device may correspond to a plurality of pieces of time reference information, any one of the plurality of pieces of corresponding time reference information may include time precision information. For example, some of the plurality of pieces of corresponding time reference information may be time reference information with relatively low time precision, for example, time reference information with time precision of 10 ms or 1 ms, and some of the plurality of pieces of corresponding time reference information may be time reference information with relatively high time precision, for example, time reference information with time precision of 1 microsecond or 10 microseconds or nanoseconds.

In other words, a reference time of one control device may correspond to time reference information with different time precision. The network device may send time reference information with different time precision in a broadcast manner; or may send time reference information by using different sending methods, for example, the network device may send time reference information with relatively large time precision in a broadcast manner, and may send time reference information with relatively small time precision in a unicast manner.

Manner 2: The time reference information may be divided into two parts of time information, a first part of time information may be a time with relatively large time precision, for example, may be a time that is accurate to 10 milliseconds in the reference time of the control device, and a second part of time information may be time with smaller time precision based on the first part of time information, for example, the second part of time information may be time accurate to 1 microsecond in the reference time of the control device.

For example, the first part of time information may represent X (hour):Y (minute):Z (second) in the reference time of the control device, and the second part of time information may represent M microseconds in the reference time of the control device. In this case, it may be determined, based on the first part of time information and the second part of time information, that the reference time of the control device is X (hour):Y (minute):Z (second):M (microsecond).

When the terminal requires that a reference time of the terminal is accurate to second, the terminal needs to read only the first part of time information from the time reference information; or when the terminal requires that a reference time of the terminal is accurate to microsecond, the terminal needs to read the first part of time information and the second part of time information from the time reference information.

In the description of manner 2, an example in which the time reference information includes only two parts of information is used for description. In actual application, the time reference information may include a plurality of parts of time information, separately representing time information with different time precision in the reference time of the control device, to meet time precision requirements of different terminals for reference times of the terminals.

The following separately describes the foregoing three types of information:

1. The device information of the control device.

The device information of the control device may be an identifier of the control device, for example, a MAC address or an IP address, or may be a device number, name, or model, a used Ethernet protocol type, or the like of the control device. Any information that can represent the control device is applicable to this embodiment of this application. When the identification information element includes the device information of the control device, different time reference information may be distinguished from each other by using device information of control devices, and a specific control device whose reference time corresponds to the reference time indicated by the reference time information element in the time reference information may be further determined.

2. The identification information of the clock.

Different control devices may have a same clock or may have different clocks, and control devices have a same reference time when the control devices have a same clock. Therefore, reference times of different control devices may be distinguished from each other by using clocks. In other words, the identification information element may further include the identification information of the clock, and the identification information of the clock may be clock source information of the clock, or may be time precision information of the clock.

When the identification information element includes the identification information of the clock, different time reference information may be distinguished from each other by using identification information of clocks, and a specific clock may be further determined, where a reference time based on the specific clock corresponds to the reference time indicated by the reference time information element in the time reference information.

When the identification information element includes the clock source information of the clock, time reference information with different clock sources may be distinguished from each other by using clock source information of clocks, and a specific clock source may be further determined, where a reference time from the specific clock source corresponds to the reference time indicated by the reference time information element in the time reference information, for example, a global positioning system (GPS) clock, a coordinated universal time (UTC) clock, a local controller clock 1, or a local controller clock 2.

When the identification information element includes the time precision information of the clock, time reference information with different precision may be distinguished from each other by using time precision information of clocks, and specific precision may be further determined, where a reference time with the specific precision corresponds to the reference time indicated by the reference time information element in the time reference information. For example, the time precision may be 10 milliseconds, 1 millisecond, 10 microseconds, 1 microsecond, or 100 nanoseconds.

Table 3 shows a message combination manner in which the network device sends the time reference information. The time reference information includes a plurality of pieces of time information with different time precision. The first part of the time reference information is time information with time precision of 10 milliseconds and is used to represent time accurate to 10 milliseconds in the reference time of the control device. The second part of the time reference information is time information with other time precision and represents time with the other time precision in the reference time of the control device. In Table 3, the multi information element in a message may represent a quantity of pieces of time information with other time precision.

The second part of the time reference information includes the time reference of 1 millisecond, the time reference of 1 microsecond, and the time reference of 100 nanoseconds. The time reference of 1 ms is time information with time precision of 1 millisecond and is used to indicate time accurate to 1 millisecond in the reference time of the control device. The time reference of 1 microsecond is time information with time precision of 1 microsecond and is used to indicate time accurate to 1 microsecond in the reference time of the control device. The time reference of 100 nanoseconds is time information with time precision of 100 nanoseconds and is used to indicate time accurate to 100 nanoseconds in the reference time of the control device.

After receiving the time reference information, the terminal may determine, based on the first part and the second part, a reference time of time precision required by the terminal.

TABLE 3

| Information element/<br>Group name | Multi | Semantics description |
| --- | --- | --- |
| First part | | Reference time of 10 ms |
| Second part | 1 to N | N is greater than or equal to 1 |
| Time reference of 1 millisecond | | Time accurate to 1 millisecond |
| Time reference of 1 microsecond | | Time accurate to 1 microsecond |
| Time reference of 100 nanoseconds | | Time accurate to 100 nanoseconds |

3. The Index of the Time Reference Information.

Because the network device needs to send the plurality of pieces of time reference information to the terminal, the network device may set indexes for the plurality of pieces of time reference information to distinguish between different time reference information. In this case, the identification information element may include the index of the time reference information. For example, the network device may number the time reference information, for example, from 1 to N, for sorting, where each number may be used as an index of one piece of time reference information.

When the identification information element includes the index of the time reference information, different time reference information may be distinguished from each other by using indexes of the time reference information, and reference time information elements in the time reference information may be further distinguished from each other.

The identification information element may include any one of the device information of the control device, the identification information of the clock, or the index of the time reference information, or may include a plurality of the device information of the control device, the identification information of the clock, or the index of the time reference information. This is not limited in this embodiment of this application.

Step 303: The network device sends the plurality of pieces of time reference information to the terminal.

The network device may send the plurality of pieces of time reference information to the terminal after determining the plurality of pieces of time reference information.

In a possible implementation, the network device may send the plurality of pieces of time reference information in a broadcast manner.

When broadcasting the plurality of pieces of time reference information, the network device may separately broadcast each piece of time reference information, or may add the plurality of pieces of time reference information to one piece of broadcast information for sending.

In actual application, the control device sends a data packet to the terminal by using the network device; that is, the network device may receive data packets from different control devices and then forward the data packets to corresponding terminals. Usually, any terminal may receive a data packet from only one or more specific control devices, and different terminals may receive data packets from different control devices. The network device may determine reference times of all control devices and determine corresponding time reference information, and then broadcast all the time reference information to the terminal. In this way, any terminal can receive time reference information. The reference time indicated by all the time reference information definitely includes a reference time of one or more specific control devices, so that the terminal can determine the reference time of the one or more specific control devices, and then the terminal can determine the reference time of the terminal based on the plurality of pieces of time reference information. Therefore, the terminal can stay synchronized with the control device, and further, when subsequently receiving a data packet, the terminal can precisely parse a timestamp in the data packet.

In another possible implementation, the network device may send the plurality of pieces of time reference information in a unicast manner.

When sending the plurality of pieces of time reference information, the network device may separately add each piece of time reference information to one piece of dedicated signaling and send the dedicated signaling to the terminal, or may add the plurality of pieces of time reference information to one piece of dedicated signaling and send the dedicated signaling to the terminal. It may be understood that, the dedicated signaling is a message sent by the network device to a specific terminal.

In actual application, the network device may determine reference times of all control devices and determine corresponding time reference information, and then send all the time reference information to the terminal by using a unicast method. In this way, the terminal may receive all the time reference information. The reference time indicated by all the time reference information includes a reference time of one or more specific control devices, so that the terminal can determine the reference time of the one or more specific control devices, and then the terminal can determine the reference time of the terminal based on the plurality of pieces of time reference information. Alternatively, the network device may selectively send some pieces of time reference information to the terminal, for example, send, to the corresponding terminal, time reference information used to indicate a reference time of one or more specific control devices. In this way, the terminal can determine the reference time of the one or more specific control devices, and then the terminal can determine the reference time of the terminal based on the time reference information. Therefore, the terminal keeps time synchronization with the one or more specific control devices, and then can precisely parse a timestamp in a data packet based on the reference time of the terminal, so that an instruction execution time can be correctly determined.

The foregoing manners of sending the plurality of pieces of time reference information are examples for description. This is not limited in this embodiment of this application. Any manner in which the plurality of pieces of time reference information can be sent to the terminal is applicable to this embodiment of this application.

The terminal may perform step 304 after receiving the plurality of pieces of time reference information from the network device.

Step 304: The terminal determines first time reference information from the plurality of pieces of time reference information.

The terminal receives the plurality of pieces of time reference information, and determines one piece of time reference information from the plurality of pieces of time reference information as the first time reference information.

There are many bases for determining the first time reference information by the terminal from the plurality of pieces of time reference information. The following lists two manners:

1. The terminal determines the first time reference information from the plurality of pieces of time reference information based on preset configuration information.

Any terminal may receive a data packet from only one or more specific control devices, but the terminal receives a data packet from only one specific control device at a specific moment or in a specific time period. Device information and moment or time period information of the one or more specific control devices may be preconfigured in the terminal. When the terminal needs to determine first time reference information from a plurality of pieces of time reference information, the terminal may determine one piece of time reference information as the first time reference information based on the preset configuration information.

Optionally, the terminal determines the first time reference information from the plurality of pieces of time reference information based on a time precision requirement of the terminal. The precision requirement may be preconfigured.

In a possible implementation, the terminal determines, from the plurality of pieces of time reference information based on precision of time information in a received data packet, first time reference information whose time precision is equal to the precision of the time information in the data packet.

The following uses, for description, an example in which device information of one control device is preconfigured in the terminal and the identification information element includes the device information of the control device. When receiving the plurality of pieces of time reference information, the terminal may traverse identification information elements of the plurality of pieces of time reference information based on the preconfigured device information of the control device, and determine the time reference information whose identification information element is the device information of the control device as the first time reference information.

For ease of description, in the foregoing description, an example in which the preset configuration information is device information of only one control device is used. Actually, the terminal may receive a data packet from only one control device. In this case, the preset configuration information may include device information of the control device. Alternatively, the terminal may receive a data packet from one control device in a specific time period or at a specific moment. In this case, the preset configuration information may include device information of the control device and time period or moment information. When determining the first time reference information, the terminal may determine the first time reference information based on a current moment or time period of the terminal and the preset configuration information.

In the foregoing description, an example in which the preset configuration information is only the device information of the control device. Actually, the preset configuration information may alternatively be other information, such as the identification information of the clock. This is not limited in this embodiment of this application. Any configuration information that enables the terminal to determine the first time reference information is applicable to this embodiment of this application.

2. The terminal determines the first time reference information from the plurality of pieces of time reference information based on indication information from the network device.

The network device may send the indication information to the terminal, where the indication information is used to indicate the first time reference information. The terminal receives the indication information, and determines the first time reference information from the plurality of pieces of time reference information based on the indication information.

The indication information and the plurality of pieces of time reference information may be separately sent, or may be added to one message for being sent to the terminal.

For example, the network device may broadcast the plurality of pieces of time reference information to the terminal, and then send the indication information to the terminal by using dedicated signaling.

For another example, the network device may add the indication information and the plurality of pieces of time reference information to one piece of dedicated signaling and send the dedicated signaling to the terminal.

A reference time indicated by a reference time information element in the first time reference information is a reference time of a first control device, and the indication information may include some or all pieces of the following information:

device information of the first control device, identification information of a first clock, an index of the first time reference information, or precision information of the first time reference information, where the first clock is a clock of the first control device.

For description of the device information of the first control device, the identification information of the first clock, and the index of the first time reference information, refer to the related description of the identification information element in the time reference information. Details are not described herein again.

It should be noted that, types of information carried in the indication information need to overlap types of information carried in the identification information element in the time reference information. For example, if the identification information element in the time reference information includes the device information of the control device and the index of the time reference information, the indication information needs to carry one or both of the device information of the first control device and the index of the first time reference information, so that the terminal can successfully determine the first time reference information from the plurality of pieces of time reference information based on the indication information after receiving the indication information and the plurality of pieces of time reference information.

Step 305: The terminal determines the reference time of the terminal based on the first time reference information.

After determining the first time reference information, the terminal may correct the reference time of the terminal based on the reference time information element in the first time reference information, and use, as the reference time of the terminal, the reference time indicated by the reference time information element in the first time reference information. In this way, the reference time of the first control device can be kept consistent with the reference time of the terminal. In other words, the first control device can keep time synchronization with the terminal. In this way, after the terminal receives a data packet from the first control device, when parsing a timestamp in the data packet, the terminal determines, based on the determined reference time of the terminal, the time indicated by the timestamp in the data packet, so that the timestamp in the data packet from the first control device can be precisely parsed.

In the embodiment shown in FIG. 3, the network device may send the plurality of pieces of time reference information to the terminal, and the terminal determines the first time reference information after receiving the plurality of pieces of time reference information, and then may determine the reference time of the terminal. Because the time reference information indicates the reference time of the control device, the reference time that is of the terminal and that is determined based on the first time reference information may be the same as the reference time of the control device, so that the terminal keeps time synchronization with the control device.

Figure 4:
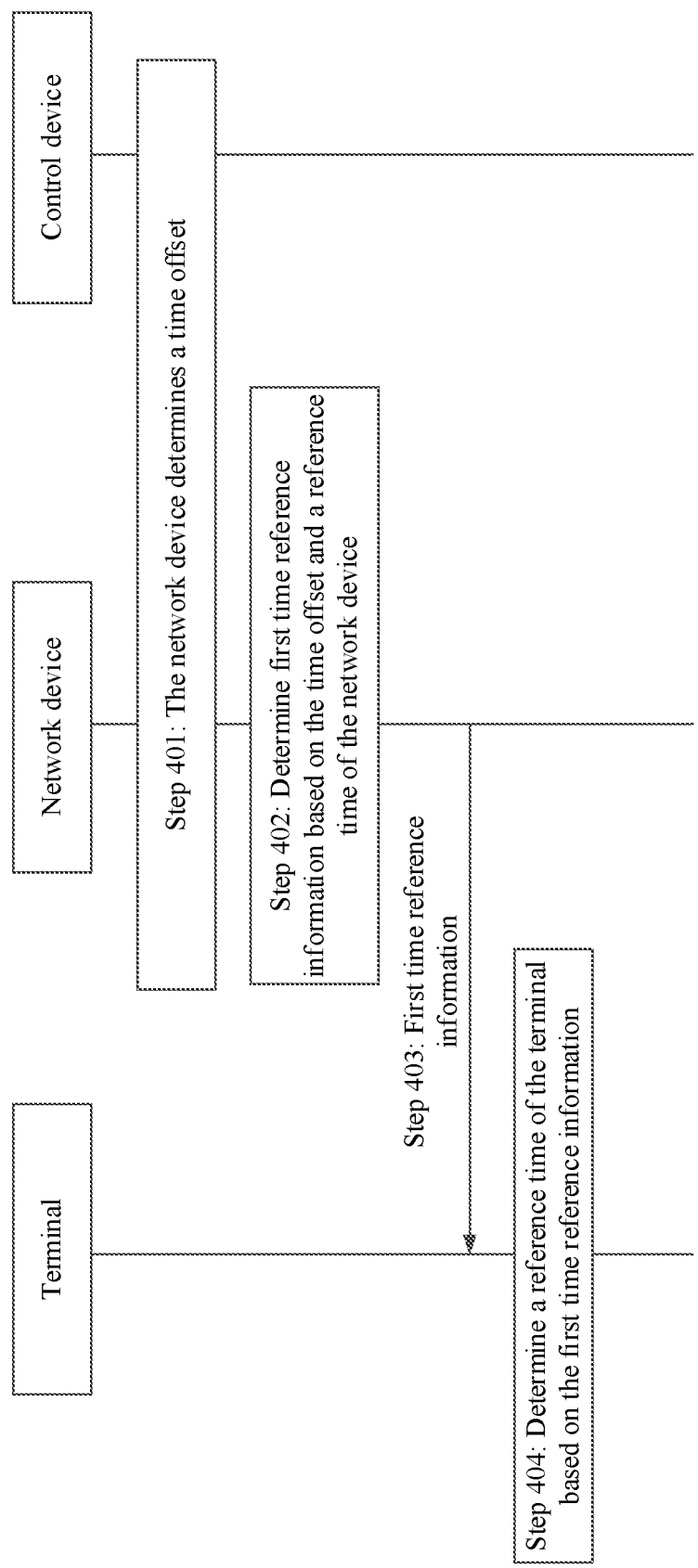

Case 2: FIG. 4 shows a reference time determining method according to an embodiment of this application. The method includes the following steps:

Step 401: A network device determines a time offset, where the time offset represents a time difference between a reference time of a first control device and a reference time of the network device.

When the network device communicates with only the first control device or a terminal receives a data packet from only the first control device, the network device may determine only one time offset. For a manner in which the network device determines the time offset, refer to the related description in step 301. Details are not described herein again.

Step 402: The network device determines first time reference information based on the time offset and the reference time of the network device, where the first time reference information is used to indicate the reference time of the first control device.

A difference between the reference time of the network device and the time offset is the reference time of the first control device, so that the first time reference information can be determined.

Specifically, the first time reference information may include a reference time information element. Because the network device sends only the first time reference information to the terminal, the first time reference information may include an identification information element, or may not include the identification information element. This is not limited in this application.

For description of the reference time information element and the identification information element, refer to the related description in step 302. Details are not described herein again.

Step 403: The network device sends the first time reference information to the terminal.

The network device may send the first time reference information in a broadcast manner, or may send the first time reference information in a unicast manner.

The terminal may perform step 404 after obtaining the first time reference information from the network device.

Step 404: The terminal determines a reference time of the terminal based on the first time reference information.

After determining the first time reference information, the terminal may correct the reference time of the terminal based on the reference time information element in the first time reference information, and may use, as the reference time of the terminal, the reference time indicated by the reference time information element in the first time reference information. In this way, the reference time of the first control device can be kept consistent with the reference time of the terminal, thereby implementing time synchronization between the terminal and the first control device.

The following further describes the embodiment shown in FIG. 3 or FIG. 4 by using an example in which the terminal is UE, the network device is a UPF entity, the control device is a PLC, and one or more PLCs exist.

Figure 5:
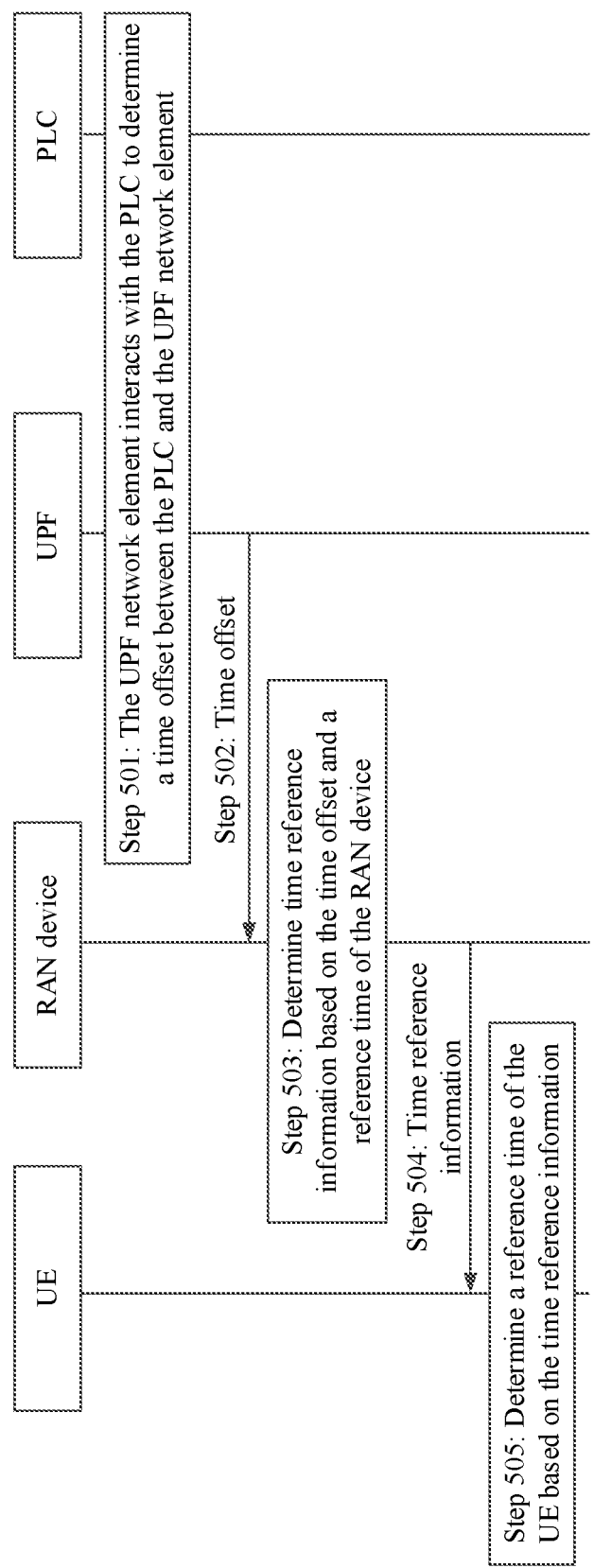

FIG. 5 shows a reference time determining method according to an embodiment of this application, where one or more PLCs are represented by using only one PLC. The method includes the following steps:

Step 501: A UPF entity interacts with a PLC to determine a time offset between the PLC and the UPF entity.

Step 502: The UPF entity sends the time offset to a RAN device.

Step 503: After receiving the time offset, the RAN device determines time reference information based on the time offset and a reference time of the RAN device.

Step 504: The RAN device sends the time reference information to UE.

Step 505: The UE determines a reference time of the UE based on the time reference information after receiving the time reference information.

The second possible implementation may specifically include two cases: Case 1: The network device sends a plurality of pieces of time reference information to the terminal. Case 2: The network device sends one piece of time reference information to the terminal. The time reference information is used to indicate a time offset between a reference time of a control device and a reference time of the network device. The following separately describes the two cases in the second possible implementation.

Figure 6:
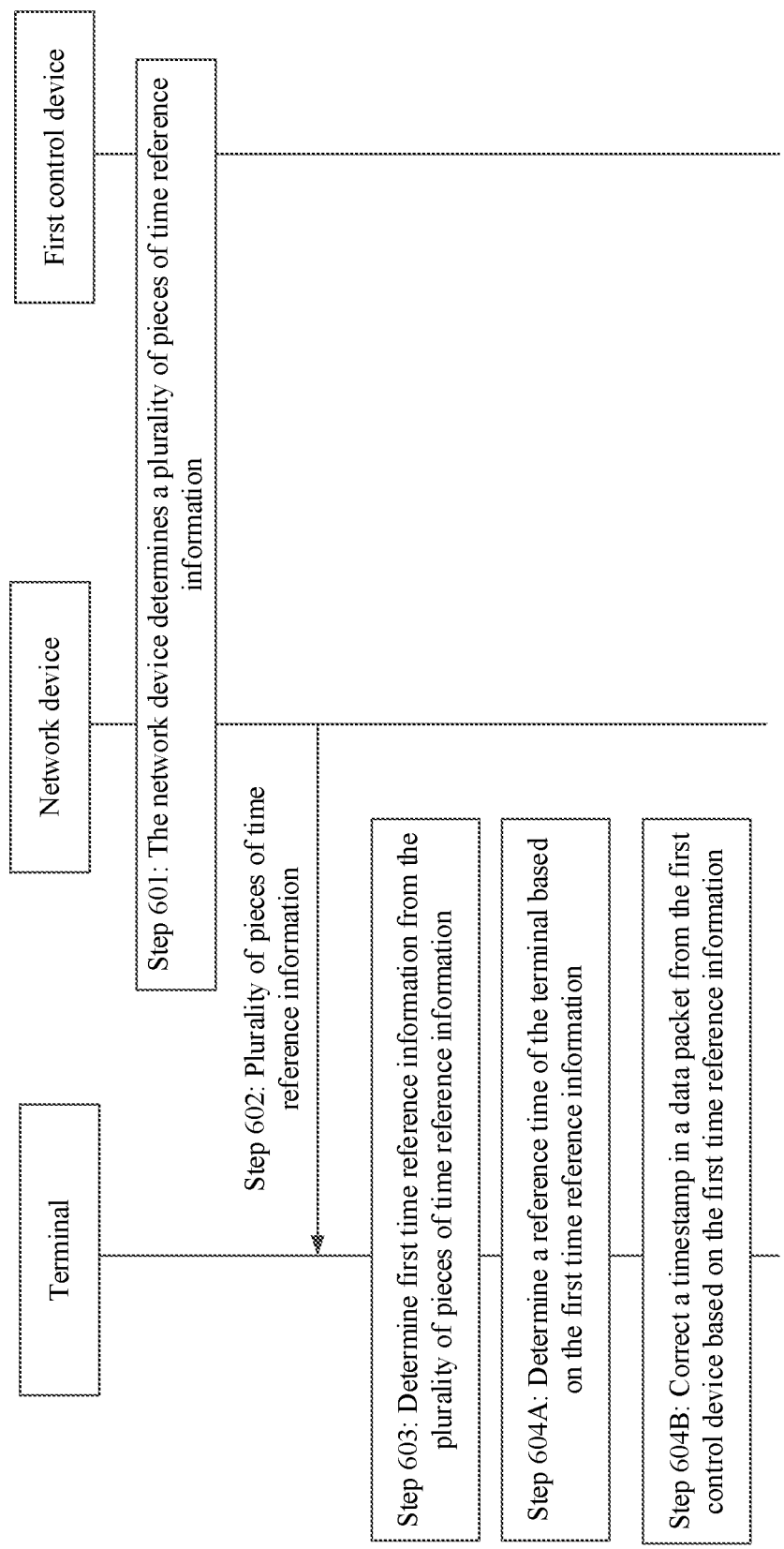

Case 1: FIG. 6 shows a reference time determining method according to an embodiment of this application. The method includes the following steps:

Step 601: A network device determines a plurality of pieces of time reference information, where any time reference information indicates a time offset between a reference time of at least one control device and a reference time of the network device.

Each control device communicates with, for example, sends a data packet to, a terminal by using the network device. Therefore, a plurality of control devices exist. When a plurality of control devices exist, for any control device, the network device may determine a time offset between a reference time of the control device and the reference time of the network device, where the time offset is equal to a time difference between the reference time of the control device and the reference time of the network device.

For a manner in which the network device determines a time offset between a reference time of any control device and the reference time of the network device, refer to step 301. Details are not described herein again.

Because time offsets between reference times of different control devices and the reference time of the network device exist, in other words, a plurality of time offsets exist, the network device may determine the plurality of pieces of time reference information by using the plurality of time offsets.

Specifically, the time reference information may include a time offset information element, and the time offset information element may indicate a time offset between a reference time of one control device and the reference time of the network device. Because the network device determines the plurality of pieces of time reference information, to distinguish between different time reference information, the time reference information may further include an identification information element.

The identification information element may include some or all pieces of the following information:

device information of the control device, identification information of a clock, or an index of the time reference information.

For description of the three types of information, refer to the related description in step 302. Details are not described herein again.

The identification information element may include any one of the device information of the control device, the identification information of the clock, or the index of the time reference information, or may include a plurality of the device information of the control device, the identification information of the clock, or the index of the time reference information. This is not limited in this embodiment of this application.

After determining a time offset between a reference time of any control device and the reference time of the network device, the network device may determine the plurality of pieces of time reference information, and then perform step 602.

Step 602: The network device sends the plurality of pieces of time reference information to the terminal.

The network device may send the plurality of pieces of time reference information to the terminal after determining the plurality of pieces of time reference information. For a manner in which the network device sends the plurality of pieces of time reference information to the terminal, refer to the related description in step 303. Details are not described herein again.

The terminal may perform step 603 after receiving the plurality of pieces of time reference information from the network device.

Step 603: The terminal determines first time reference information from the plurality of pieces of time reference information, where the first time reference information is used to indicate a time offset between a reference time of a first control device and the reference time of the network device.

TABLE 4

| Information element/<br>Group name | Multi | Semantics description |
| --- | --- | --- |
| Time offset list | 1 to N | N is greater than or equal to 1 |
| Time offset 1 | | Time offset between a control device 1 and the network device |
| Time offset 2 | | Time offset between a control device 2 or a control device 3 and the network device |
| Time offset 3 | | Time offset between a control device 4 and the network device |

Table 4 shows a message combination manner in which the network device sends the plurality of pieces of time reference information. The network device may combine the plurality of pieces of time reference information into one list and add the list to one message. The multi information element in the message may represent a quantity of time offsets. Then, each time offset is described. For example, the time offset 1 is the first piece of time reference information and may represent the time offset between a reference time of the control device 1 and the reference time of the network device; the time offset 2 is the second time reference information and may represent the time offset between a reference time of the control device 2 or the control device 3 and the reference time of the network device; and the time offset 3 is the third time reference information and may represent the time offset between a reference time of the control device 4 and the reference time of the network device.

Because the terminal receives the plurality of pieces of time reference information, the terminal needs to determine one piece of time reference information from the plurality of pieces of time reference information as the first time reference information. For a manner in which the terminal determines the first time reference information from the plurality of pieces of time reference information, refer to step 304. Details are not described herein again.

The network device may further send time reference information of the network device to the terminal. The time reference information of the network device is used to indicate the reference time of the network device.

A manner in which the network device sends the time reference information of the network device is not limited in this embodiment of this application. For example, the network device may send the time reference information of the network device to the terminal in a broadcast manner, or may send the time reference information of the network device to the terminal in a unicast manner. Any manner in which the time reference information of the network device can be sent is applicable to this embodiment of this application.

The time reference information of the network device and the plurality of pieces of time reference information may be separately sent, or may be added to one message for sending. This is not limited in this embodiment of this application.

The terminal may perform step 604A or step 604B after receiving the first time reference information.

Step 604A: The terminal determines a reference time of the terminal based on the first time reference information.

The terminal may determine the reference time of the terminal based on the first time reference information after receiving the time reference information of the network device and the first time reference information.

After determining the first time reference information, the terminal may determine the reference time of the terminal based on a difference between the time offset indicated by a time offset information element in the first time reference information and the reference time of the network device. Because the time offset is the time offset between the reference time of the first control device and the reference time of the network device, the reference time that is of the terminal and that is determined based on the difference between the time offset indicated by the time offset information element in the first time reference information and the reference time of the network device should be consistent with the reference time of the first control device. Then, after the terminal receives a data packet from the first control device, the terminal may parse a timestamp in the data packet from the first control device based on the reference time of the terminal, so that time indicated by the timestamp can be precisely determined.

Step 604B: The terminal corrects a timestamp in a data packet from the first control device based on the first time reference information.

After receiving the first time reference information, the terminal may correct the timestamp in the data packet from the first control device based on the first time reference information. Specifically, the terminal may use a sum of the time offset indicated by a time offset information element in the first time reference information and the time indicated by the timestamp as a corrected timestamp. In this case, the reference time of the terminal is not corrected, and is still kept consistent with the reference time of the network device. Because the corrected timestamp is obtained by adding the time offset to the timestamp existing before the correction, and the time offset is the time offset between the reference time of the first control device and the reference time of the network device, the terminal can precisely parse the corrected timestamp based on the current reference time of the terminal.

In the embodiment shown in FIG. 6, the network device may send the plurality of pieces of time reference information to the terminal, and the terminal determines the first time reference information after receiving the plurality of pieces of time reference information, and then may determine the reference time of the terminal or correct the timestamp in the data packet from the first control device. Because any time reference information is used to indicate a time offset between a reference time of a control device and the reference time of the network device, the reference time that is of the terminal and that is determined based on the first time reference information and the reference time of the network device can be kept consistent with the reference time of the first control device, so that the terminal keeps time synchronization with the first control device. Alternatively, if the terminal corrects the timestamp, the terminal may more precisely parse the corrected timestamp.

Figure 7:
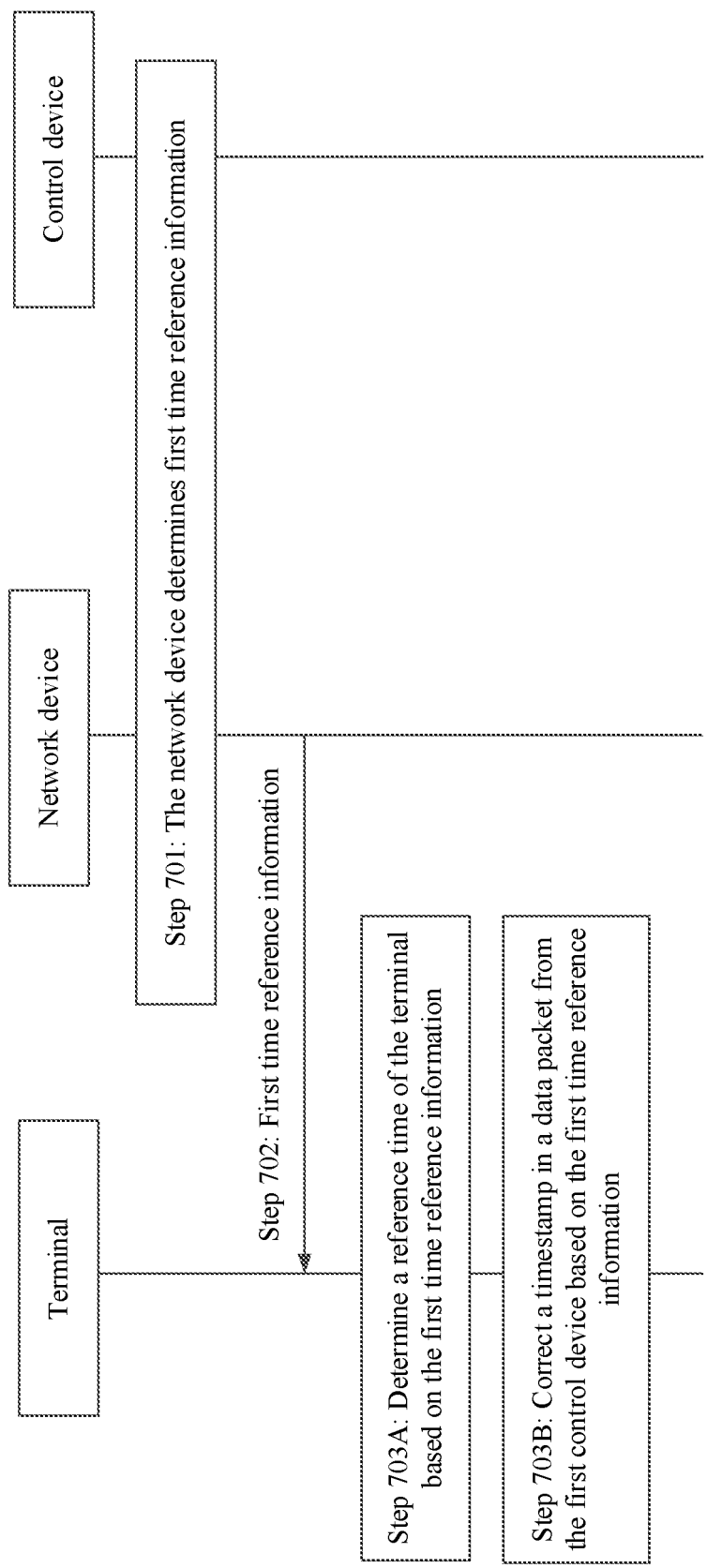

Case 2: FIG. 7 shows a reference time determining method according to an embodiment of this application. The method includes the following steps:

Step 701: A network device determines first time reference information, where the first time reference information is used to indicate a time offset between a reference time of a first control device and a reference time of the network device.

When the network device communicates with only the first control device or a terminal receives a data packet from only the first control device, the network device may determine only the first time reference information. Alternatively, when control devices communicating with the network device have a same reference time, the network device may determine only the first time reference information. For a manner in which the network device determines the time offset, refer to the related description in step 301. Details are not described herein again.

Specifically, the first time reference information may include a time offset information element, and the time offset information element is used to indicate the time offset between the reference time of the first control device and the reference time of the network device. Because the network device sends the first time reference information to the terminal, the first time reference information may include an identification information element, or may not include the identification information element. This is not limited in this application.

For description of the time offset information element and the identification information element, refer to the related description in step 302. Details are not described herein again.

Step 702: The network device sends the first time reference information to the terminal.

The network device may send the first time reference information in a broadcast manner, or may send the first time reference information in a unicast manner.

The terminal may perform step 703A or step 703B after obtaining the first time reference information from the network device.

Step 703A: The terminal determines a reference time of the terminal based on the first time reference information.

For related description of determining the reference time of the terminal by the terminal based on the first time reference information, refer to step 604A. Details are not described herein again.

Step 703B: The terminal corrects a timestamp in a data packet from the first control device based on the first time reference information.

For related description of correcting the timestamp in the data packet from the first control device by the terminal based on the first time reference information, refer to step 604B. Details are not described herein again.

The following further describes the embodiment shown in FIG. 7 or FIG. 6 by using an example in which the terminal is UE, the network device is a UPF entity, the control device is a PLC, and one or more PLCs exist.

Figure 8:
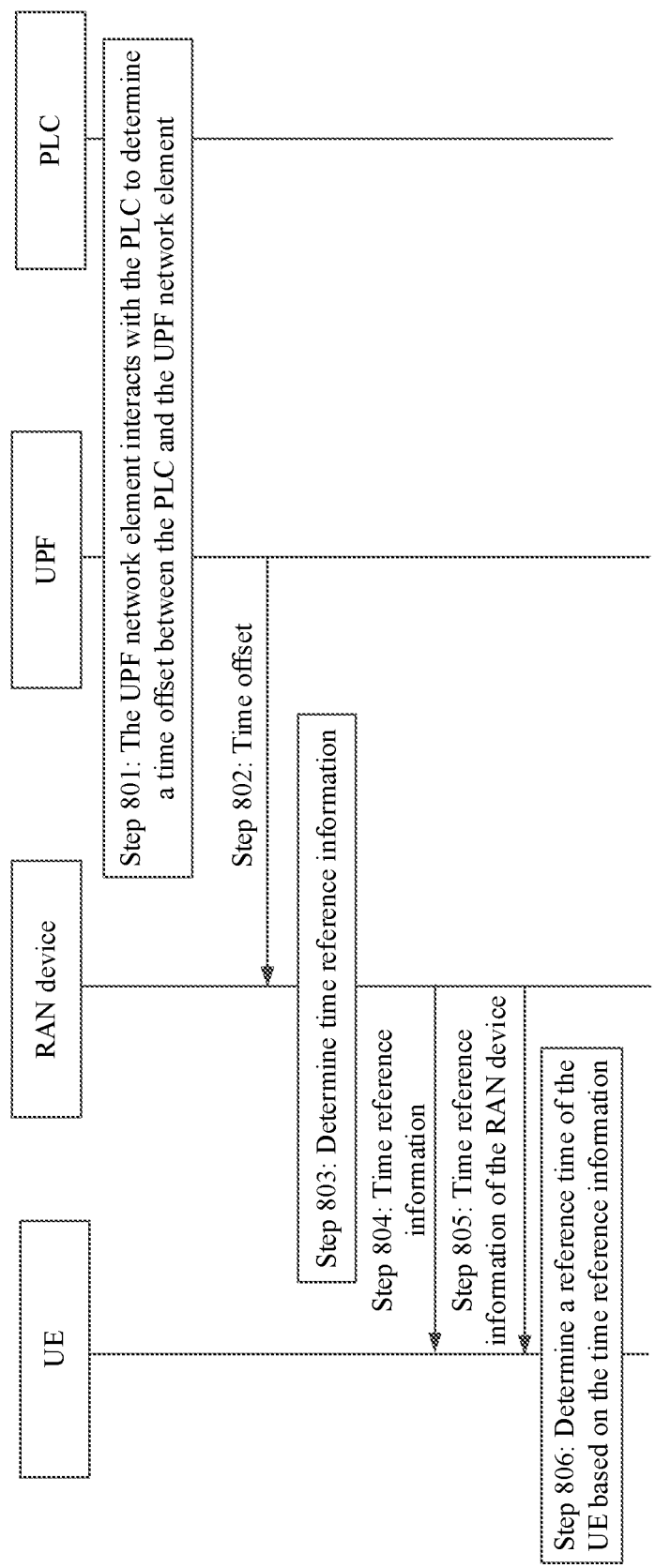

FIG. 8 shows a reference time determining method according to an embodiment of this application, where one or more PLCs are represented by using only one PLC. The method includes the following steps:

Step 801: A UPF entity interacts with a PLC to determine a time offset between the PLC and the UPF entity.

Step 802: The UPF entity sends the time offset to a RAN device.

Step 803: The RAN device determines time reference information after receiving the time offset.

Step 804: The RAN device sends the time reference information to UE.

Step 805: The RAN device sends time reference information of the RAN device to the UE, where the time reference information of the RAN device is used to indicate a reference time of the RAN device.

An execution sequence of step 804 and step 805 is not limited in this embodiment of this application. In addition, step 804 and step 805 may be performed successively, or may be performed simultaneously.

Step 806: The UE determines a reference time of the UE based on the time reference information and the reference time of the RAN device after receiving the time reference information.

Figure 9:
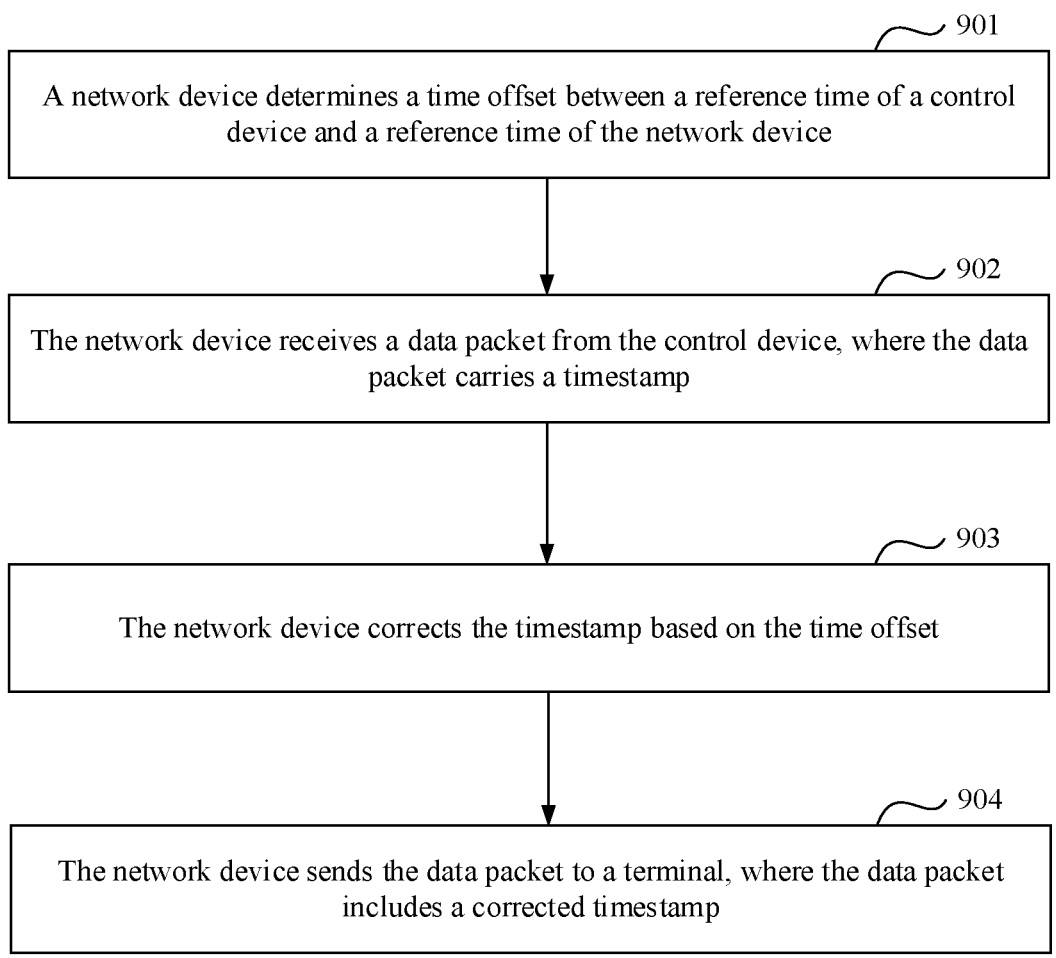

In the third possible implementation, FIG. 9 shows a reference time determining method according to an embodiment of this application. The method includes the following steps:

Step 901: A network device determines a time offset between a reference time of a control device and a reference time of the network device.

For a manner in which the network device determines the time offset, refer to the related description in step 301. Details are not described herein again.

Step 902: The network device receives a data packet from the control device, where the data packet carries a timestamp.

The control device may send the data packet to a terminal by using the network device. Specifically, the control device first sends the data packet to the network device. The network device performs step 903 after receiving the data packet.

Step 903: The network device corrects the timestamp based on the time offset.

Because the data packet is from the control device, the timestamp indicates a time that is based on the reference time of the control device. To enable the time indicated by the timestamp to be based on a reference time of the terminal, the network device needs to correct the timestamp.

Because the reference time of the terminal is kept consistent with the reference time of the network device, the network device corrects the timestamp based on the time offset. Specifically, the network device may correct the timestamp based on a sum of or a difference between the time offset and the time indicated by the timestamp, and use the sum of or the difference between the time offset and the time indicated by the timestamp as time indicated by a corrected timestamp.

The network device may perform step 904 after correcting the timestamp.

Step 904: The network device sends the data packet to the terminal, where the data packet includes the corrected timestamp.

When the network device is a core network device, the network device may send the data packet to the terminal by using another network device, for example, a RAN device.

The RAN device may send the data packet to the terminal after the network device sends the data packet to the RAN device.

When the network device is a RAN device, the network device may directly send the data packet to the terminal.

A transmission delay exists in information exchange between the network device and the terminal. In the following embodiments of this application, the transmission delay may be considered, and a reference time may be corrected by using the transmission delay, so that precision of the reference time can be further improved.

The information exchange between the network device and the terminal is used as an example. To ensure orthogonality of uplink (UL) transmission to reduce intra-cell interference, the network device requires that signals of different terminals from a same subframe but different frequency domain resources (RBs) arrive at the network device at basically aligned time. Provided that the network device receives, within a cyclic prefix (CP) range, uplink data sent by the terminal, the network device can correctly decode the uplink data. Therefore, uplink synchronization requires that time at which signals of different terminals from a same subframe arrive at the network device all falls within a CP.

Figure 10A:
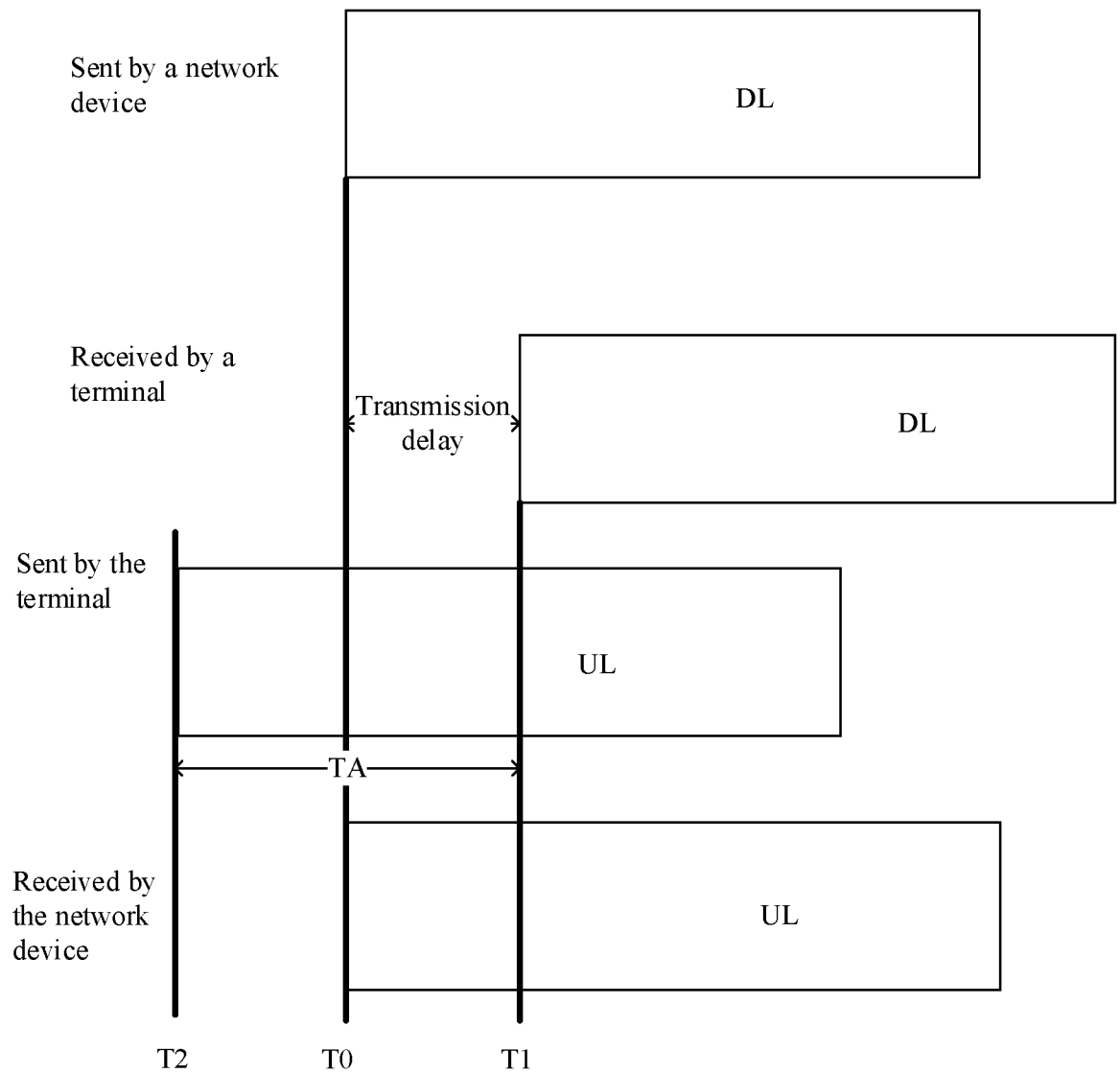
FIG. 10A is a schematic diagram of a TA determining method according to this application.

As shown in FIG. 10A, the network device sends a downlink (DL) signal at a moment T0, and the terminal receives the downlink signal at a moment T1 after the downlink signal is transmitted for a period of time. To enable a signal sent by the terminal to arrive at the network device on time, the terminal sends an uplink signal at a moment T2. The uplink signal arrives at the network device at the moment T0 after being transmitted for a period of time. A difference between T2 and T1 is a TA value. Assuming that an uplink delay is the same as a downlink delay, a transmission delay offset is estimated to be TA/2.

Currently, an NR (new radio access technology) or a long term evolution (LTE) system adjusts precision of the TA, and consequently the TA cannot reach a microsecond level or even higher precision in all subcarrier spacings supported by a wireless system. To avoid changing a format of a TA (timing advance) command, a message used to notify of a transmission delay between the network device and the terminal is introduced. For example, the transmission delay may be TA/2. Precision of this value is set based on the precision required by the terminal. The terminal receives the message that is sent by the network device and that is used to notify of the transmission delay between the network device and the terminal, so that the terminal adds the transmission delay between the network device and the terminal, for example, adds TA/2, to the reference time that is of the terminal and that is determined in the foregoing method embodiments, and uses, as the reference time of the terminal, a reference time of the terminal to which the transmission delay between the network device and the terminal is added. The message used to notify of the transmission delay between the network device and the terminal may be a newly added MAC control element (CE), PDCP control signaling, or RRC signaling.

In an implementation, a new MAC CE is introduced to send a TA value with higher precision. Specific precision may be configured on a network side, where the terminal receives the TA value by using a MAC CE with the specific precision. Alternatively, an LCID (logical channel Identifier) may be set to indicate a type of the MAC CE. To avoid changing a format of a TA (timing advance) command, a message used to notify of a transmission delay between the network device and the terminal is introduced. For example, the transmission delay may be TA/2. Precision of this value is set based on the precision required by the terminal. The terminal receives the message that is sent by the network device and that is used to notify of the transmission delay between the network device and the terminal, so that the terminal adds the transmission delay between the network device and the terminal, for example, adds TA/2, to the reference time that is of the terminal and that is determined in the foregoing method embodiments, and uses, as the reference time of the terminal, a reference time of the terminal to which the transmission delay between the network device and the terminal is added. The message used to notify of the transmission delay between the network device and the terminal may be a newly added MAC control element (CE), PDCP control signaling, or RRC signaling.

Figure 10B:
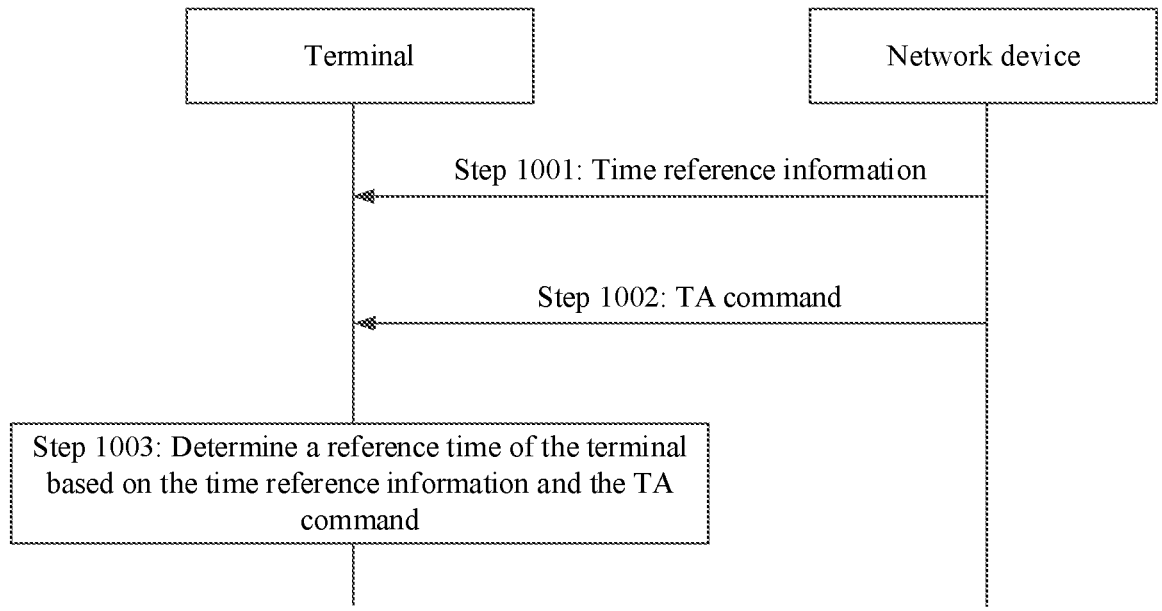
FIG. 10B is a schematic diagram of another reference time determining method according to this application.

FIG. 10B is a schematic diagram of a reference time determining method according to another embodiment of this application.

Step 1001: A network device sends time reference information to a terminal, and the terminal receives the time reference information sent by the network device.

The time reference information may be the foregoing first time reference information, namely, time reference information of a control device, or may be time reference information of the network device, namely, information used to indicate a reference time of the network device.

Step 1002: The network device sends a TA command to the terminal, where the TA command is used to indicate a TA adjustment value or a half (or ½) of the TA adjustment value.

The network device may determine the TA adjustment value based on information transmitted between the network device and the terminal. Reference may be made to an existing TA adjustment value determining manner. This is not limited in this application. For example, the network device may determine the TA adjustment value based on a reference signal sent by the terminal, or may determine the TA adjustment value based on a random access preamble.

Optionally, precision of the TA adjustment value is MTs, M is a positive integer less than or equal to 16, and Ts is a time unit whose value is 1/30.72 µs.

Optionally, the network device may further send a TA offset value to the terminal, where the precision of the TA offset value is NTs, and N is a non-negative integer less than M. In this case, the network device sends the TA adjustment value and the TA offset value to the terminal, where the precision of the TA adjustment value is less than the precision of the TA offset value.

Optionally, the TA offset value may be sent by using a MAC CE. In this case, an LCID may be set to indicate that the MAC CE is used to send the TA offset value, and the TA offset value is used to correct a reference time of the terminal. Optionally, the TA offset value may be sent by using PDCP control signaling. In this case, a PDU type may be added, that is, an indicator field in a PDU is used to indicate that the PDU is used to send the TA offset value, and the TA offset value is used to correct a reference time of the terminal. For the indicator field, an existing indicator field in the PDU may be used, and a value is newly added to indicate that the PDU is used to send the TA offset value; or an indicator field may be newly added to indicate that the PDU is used to send the TA offset value.

Step 1003: The terminal determines the reference time of the terminal based on the time reference information and the TA command, or the terminal determines the reference time of the terminal based on the time reference information, the TA command, and the TA offset value.

For example, after determining a reference time based on the time reference information, the terminal adds TA/2 and the TA offset value to the reference time to obtain a value, and determines the value as the reference time of the terminal.

The foregoing mainly describes the solutions provided in the embodiments of this application from a perspective of interaction between the terminal and the network device. It may be understood that, to implement the foregoing functions, the terminal and the network device include corresponding hardware structures and/or software modules for performing the functions. With reference to the units and algorithm steps described in the embodiments disclosed in this application, embodiments of this application can be implemented in a form of hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of the technical solutions of the embodiments of this application.

In the embodiments of this application, the terminal and the network device each may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software functional unit.

The embodiments of this application further provide an apparatus for implementing any one of the foregoing reference time determining methods. The embodiments of this application provide an apparatus, including units (or means) used to implement steps performed by the terminal in any one of the foregoing methods. The embodiments of this application further provide another apparatus, including units (or means) used to implement steps performed by the network device in any one of the foregoing methods.

Figure 11:
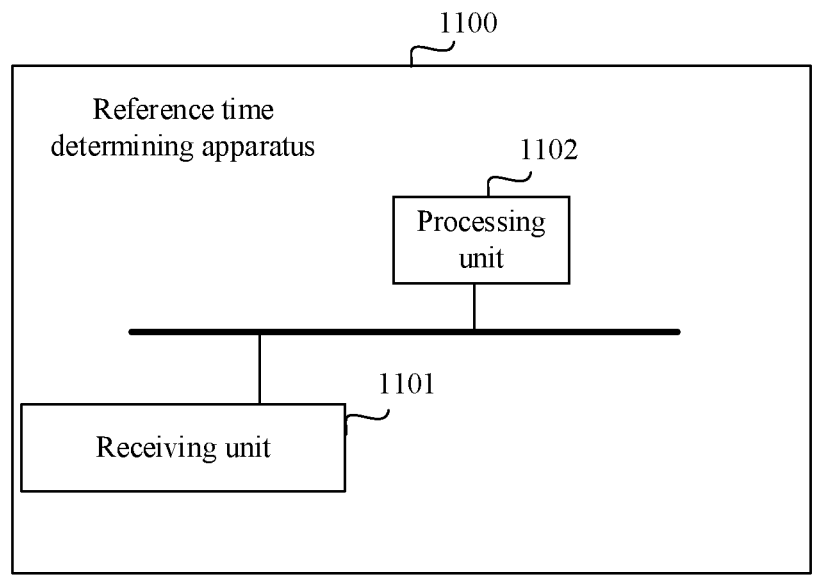
FIG. 11 and FIG. 12 are schematic structural diagrams of a reference time determining apparatus according to this application.

In a possible implementation, an embodiment of this application provides a reference time determining apparatus 1100. The reference time determining apparatus 1100 may be applied to a terminal. FIG. 11 is a schematic structural diagram of the reference time determining apparatus 1100 according to this embodiment of this application. Referring to FIG. 11, the apparatus 1100 includes a receiving unit 1101 and a processing unit 1102.

When the reference time determining apparatus 1100 is configured to perform the methods performed by the terminal in the embodiments shown in FIG. 3, FIG. 5, FIG. 6, and FIG. 8, the receiving unit 1101 is configured to receive a plurality of pieces of time reference information from a network device, and the processing unit 1102 is configured to determine first time reference information from the plurality of pieces of time reference information, and determine a reference time of the terminal based on the first time reference information.

In a possible implementation, the time reference information may represent one of the following two types of information:

Type 1: The time reference information is used to indicate a reference time of a control device, and the first time reference information is used to indicate a reference time of a first control device.

To indicate a reference time of a control device, any time reference information includes a reference time information element and an identification information element.

The reference time information element is used to indicate the reference time of the control device.

The identification information element may include some or all pieces of the following information:

device information of the control device, identification information of a clock, an index of the time reference information, or time precision information.

Type 2: The time reference information is used to indicate a time offset between a reference time of a control device and a reference time of the network device, and the first time reference information is used to indicate a time offset between a reference time of a first control device and the reference time of the network device.

To indicate a time offset between a reference time of a control device and the reference time of the network device, any time reference information includes a time offset information element and an identification information element.

The time offset information element is used to indicate the time offset between the reference time of the control device and the reference time of the network device.

The identification information element may include some or all pieces of the following information:

device information of the control device, identification information of a clock, an index of the time reference information, or time precision information.

When determining the reference time of the terminal based on the first time reference information, the processing unit 1102 may determine the first time reference information from the plurality of pieces of time reference information based on preset configuration information, or may determine the first time reference information from the plurality of pieces of time reference information based on indication information from the network device.

In a possible implementation, when the processing unit 1102 determines the first time reference information from the plurality of pieces of time reference information based on the indication information from the network device, the receiving unit 1101 may receive the indication information from the network device before the processing unit 1102 determines the first time reference information from the plurality of pieces of time reference information. The indication information is used to indicate the first time reference information, and the plurality of pieces of time reference information need to include the first time reference information.

Optionally, the plurality of pieces of time reference information and the indication information may be separately sent, or may be carried in a same message.

When indicating the first time reference information, the indication information may indicate the first time reference information by carrying some or all pieces of the following information:

device information of the first control device, identification information of a first clock, or an index of the first time reference information.

A plurality of control devices indicated by the plurality of pieces of time reference information include the first control device, and the first clock is a clock of the first control device.

In a possible implementation, when the time reference information is used to indicate the time offset between the reference time of the control device and the reference time of the network device, the receiving unit 1101 may further receive time reference information of the network device. The time reference information of the network device is used to indicate the reference time of the network device.

When determining the reference time of the terminal based on the first time reference information, the processing unit 1102 may determine the reference time of the terminal based on the first time reference information and the time reference information of the network device.

When the reference time determining apparatus 1100 is configured to perform the methods performed by the terminal in the embodiments shown in FIG. 4, FIG. 5, FIG. 7, and FIG. 8, the receiving unit 1101 is configured to receive first time reference information, and the processing unit 1102 is configured to determine a reference time of the terminal based on the first time reference information.

The first time reference information does not indicate a reference time of a network device.

Specifically, the first time reference information may represent the following two types of information:

Type 1: The first time reference information is used to indicate a reference time of a first control device.

To indicate the reference time of the first control device, the first time reference information includes a reference time information element and an identification information element.

The reference time information element is used to indicate the reference time of the first control device.

The identification information element may include some or all pieces of the following information:

device information of the first control device, identification information of a first clock, an index of the time reference information, or time precision information, where the first clock is a clock of the first control device.

Type 2: The first time reference information is used to indicate a time offset between a reference time of a first control device and the reference time of the network device.

To indicate the time offset between the reference time of the first control device and the reference time of the network device, the first time reference information includes a time offset information element and an identification information element.

The time offset information element is used to indicate the time offset between the reference time of the first control device and the reference time of the network device.

The identification information element may include some or all pieces of the following information:

device information of the first control device, identification information of a first clock, an index of the time reference information, or time precision information, where the first clock is a clock of the first control device.

In a possible implementation, when the time reference information is used to indicate the time offset between the reference time of the control device and the reference time of the network device, the receiving unit 1101 may further receive time reference information of the network device. The time reference information of the network device is used to indicate the reference time of the network device.

When determining the reference time of the terminal based on the first time reference information, the processing unit 1102 may determine the reference time of the terminal based on the first time reference information and the time reference information of the network device.

When the reference time determining apparatus 1100 is configured to perform the method performed by the terminal in the embodiment shown in FIG. 10B, the receiving unit 1101 is configured to receive time reference information, and receive a TA command; and the processing unit 1102 is configured to determine a reference time of the terminal based on the time reference information and the TA command, or determine a reference time of the terminal based on the time reference information, the TA command, and a TA offset value.

Figure 12:
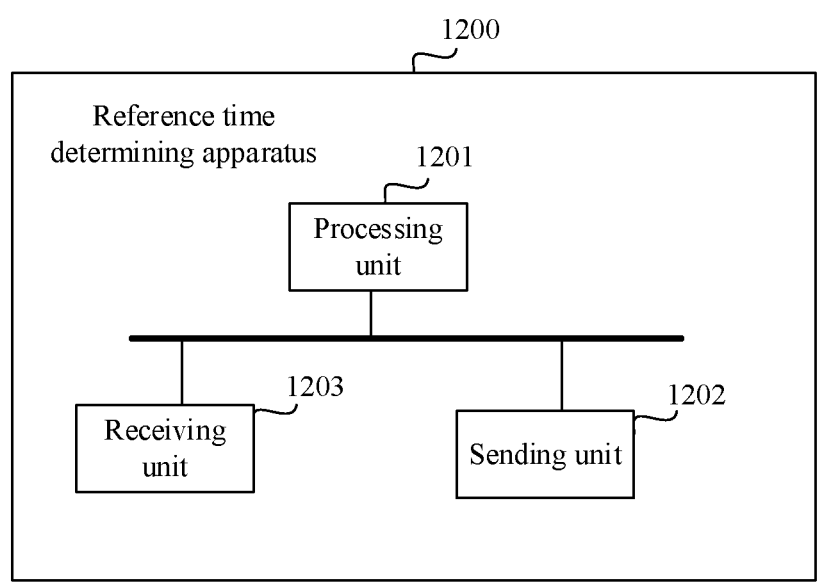

In another possible implementation, an embodiment of this application further provides a reference time determining apparatus 1200. The reference time determining apparatus 1200 may be applied to a network device. FIG. 12 is a schematic structural diagram of the reference time determining apparatus 1200 according to this embodiment of this application. Referring to FIG. 12, the apparatus 1200 includes a processing unit 1201 and a sending unit 1202.

When the reference time determining apparatus 1200 is configured to perform the methods performed by the network device in the embodiments shown in FIG. 3, FIG. 5, FIG. 6, and FIG. 8, the processing unit 1201 may be configured to perform either of the following two operations:

Operation 1: The processing unit 1201 is configured to determine a plurality of time offsets, where any time offset represents a time difference between a reference time of at least one control device and a reference time of the network device; and determine one piece of time reference information for any time offset based on the time offset and the reference time of the network device, where any time reference information indicates a reference time of at least one control device.

Operation 2: The processing unit 1201 is configured to determine a plurality of pieces of time reference information, where any time reference information indicates a time offset between a reference time of at least one control device and a reference time of the network device.

The sending unit 1202 is configured to send the plurality of pieces of time reference information to a terminal.

Corresponding to the two operations of the processing unit 1201, any time reference information has the following two representations:

Corresponding to manner 1 performed by the processing unit 1201, the time reference information is used to indicate a reference time of a control device, and the first time reference information indicates a reference time of a first control device.

To indicate a reference time of a control device, any time reference information includes a reference time information element and an identification information element.

The reference time information element is used to indicate the reference time of the control device.

The identification information element may include some or all pieces of the following information:

device information of the control device, identification information of a clock, an index of the time reference information, or time precision information.

Corresponding to manner 2 performed by the processing unit 1201, the time reference information is used to indicate a time offset between a reference time of a control device and the reference time of the network device, and the first time reference information indicates a time offset between a reference time of a first control device and the reference time of the network device.

To indicate a time offset between a reference time of a control device and the reference time of the network device, any time reference information includes a time offset information element and an identification information element.

The time offset information element is used to indicate the time offset between the reference time of the control device and the reference time of the network device.

The identification information element may include some or all pieces of the following information:

device information of the control device, identification information of a clock, an index of the time reference information, or time precision information.

In a possible implementation, the sending unit 1202 is further configured to send indication information to the terminal, where the indication information is used to indicate the first time reference information, and the plurality of pieces of time reference information need to include the first time reference information.

Optionally, the plurality of pieces of time reference information and the indication information may be separately sent, or may be carried in a same message.

When indicating the first time reference information, the indication information may indicate the first time reference information by carrying some or all pieces of the following information:

device information of the first control device, identification information of a first clock, or an index of the first time reference information, where the first clock is a clock of the first control device.

A plurality of control devices indicated by the plurality of pieces of time reference information include the first control device, and the first clock is a clock of the first control device.

In a possible implementation, when the time reference information is used to indicate the time offset between the reference time of the control device and the reference time of the network device, the sending unit 1202 may further send time reference information of the network device to the terminal. The time reference information of the network device is used to indicate the reference time of the network device.

When the reference time determining apparatus 1200 is configured to perform the methods performed by the network device in the embodiments shown in FIG. 4, FIG. 5, FIG. 7, and FIG. 8, the processing unit 1201 may be configured to perform either of the following two operations:

Operation 1: The processing unit 1201 is configured to determine a time offset, where the time offset represents a time difference between a reference time of a first control device and a reference time of the network device; and determine the first time reference information based on the time offset and the reference time of the network device, where the first time reference information is used to indicate the reference time of the first control device.

Operation 2: The processing unit 1201 is configured to determine first time reference information, where the first time reference information is used to indicate a time offset between a reference time of a first control device and a reference time of the network device.

The sending unit 1202 is configured to send the first time reference information to a terminal.

Corresponding to the two operations of the processing unit 1201, the first time reference information has the following two representations:

Corresponding to manner 1 performed by the processing unit 1201, the first time reference information is used to indicate the reference time of the first control device.

To indicate the reference time of the first control device, the first time reference information includes a reference time information element and an identification information element.

The reference time information element is used to indicate the reference time of the first control device.

The identification information element may include some or all pieces of the following information:

device information of the first control device, identification information of a first clock, an index of the first time reference information, or time precision information, where the first clock is a clock of the first control device.

Corresponding to manner 2 performed by the processing unit 1201, the first time reference information is used to indicate the time offset between the reference time of the first control device and the reference time of the network device.

To indicate the time offset between the reference time of the first control device and the reference time of the network device, the first time reference information includes a time offset information element and an identification information element.

The time offset information element is used to indicate the time offset between the reference time of the first control device and the reference time of the network device.

The identification information element may include some or all pieces of the following information:

device information of the first control device, identification information of a first clock, an index of the time reference information, or time precision information, where the first clock is a clock of the first control device.

In a possible implementation, when the first time reference information is used to indicate the time offset between the reference time of the first control device and the reference time of the network device, the sending unit 1202 may further send time reference information of the network device to the terminal. The time reference information of the network device is used to indicate the reference time of the network device.

When the reference time determining apparatus 1200 is configured to perform the method performed by the network device in the embodiment shown in FIG. 9, the reference time determining apparatus may further include a receiving unit 1203.

The processing unit 1201 is configured to determine a time offset between a reference time of a control device and a reference time of the network device.

The receiving unit 1203 is configured to receive a data packet from the control device, where the data packet carries a timestamp.

The processing unit 1201 is further configured to correct the timestamp based on the time offset.

The sending unit 1202 is configured to send the data packet to a terminal, where the data packet includes a corrected timestamp.

When the reference time determining apparatus 1200 is configured to perform the method performed by the network device in the embodiment shown in FIG. 10B, the sending unit 1202 is configured to send time reference information to a terminal, and send a TA command to the terminal; and the processing unit 1201 is configured to determine the time reference information. For a method in which the processing unit 1201 determines the time reference information, refer to a manner in which the network device determines the time reference information in any one of the foregoing method embodiments. Details are not described herein again.

The processing unit 1201 is further configured to determine a TA adjustment value based on information transmitted between the network device and the terminal.

It should be understood that, division of units in each of the foregoing apparatuses is merely logical function division. In actual implementation, all or some of the units may be integrated into one physical entity, or may be physically separated from each other. In addition, all of the units in the apparatus may be implemented in a form of software invoked by a processing element, or may be implemented in a form of hardware; or some of the units may be implemented in a form of software invoked by a processing element, and some of the units may be implemented in a form of hardware. For example, the units each may be a separately disposed processing element, or may be integrated into one chip in the apparatus for implementation. In addition, each unit may be stored in a memory in a form of a program, and invoked by a processing element of the apparatus to perform a function of the unit. In addition, all or some of the units may be integrated together, or the units may be separately implemented. The processing element herein may also be referred to as a processor, and may be an integrated circuit that has a signal processing capability. In an implementation process, the steps in the foregoing methods or the foregoing units may be implemented by using a hardware integrated logic circuit in the processing element, or may be implemented in a form of software invoked by the processing element.

For example, units in any one of the foregoing apparatuses may be one or more integrated circuits configured to implement the foregoing methods, for example, one or more application-specific integrated circuits (ASIC), one or more microprocessors (DSP), one or more field programmable gate arrays (FPGA), or a combination of at least two of these integrated circuit forms. For another example, when the units in the apparatus each may be implemented in a form of a program invoked by a processing element, the processing element may be a general purpose processor, for example, a central processing unit (CPU) or another processor that can invoke a program. For another example, these units may be integrated together and implemented in a form of a system-on-a-chip (SOC).

The foregoing receiving unit is an interface circuit of the apparatus, and is configured to receive a signal from another apparatus. For example, when the apparatus is implemented in a chip manner, the receiving unit is an interface circuit that is used by the chip to receive a signal from another chip or apparatus. The foregoing sending unit is an interface circuit of the apparatus, and is configured to send a signal to another apparatus. For example, when the apparatus is implemented in a chip manner, the sending unit is an interface circuit that is used by the chip to send a signal to another chip or apparatus.

The network device exchanges information with the terminal, for example, sends a plurality of pieces of time reference information or first time reference information to the terminal, by using an interface protocol between the network device and the terminal. Alternatively, the network device is wirelessly connected to the terminal, and the network device exchanges information with the terminal, for example, sends a plurality of pieces of time reference information or first time reference information to the terminal, by using a wireless interface.

Figure 13:
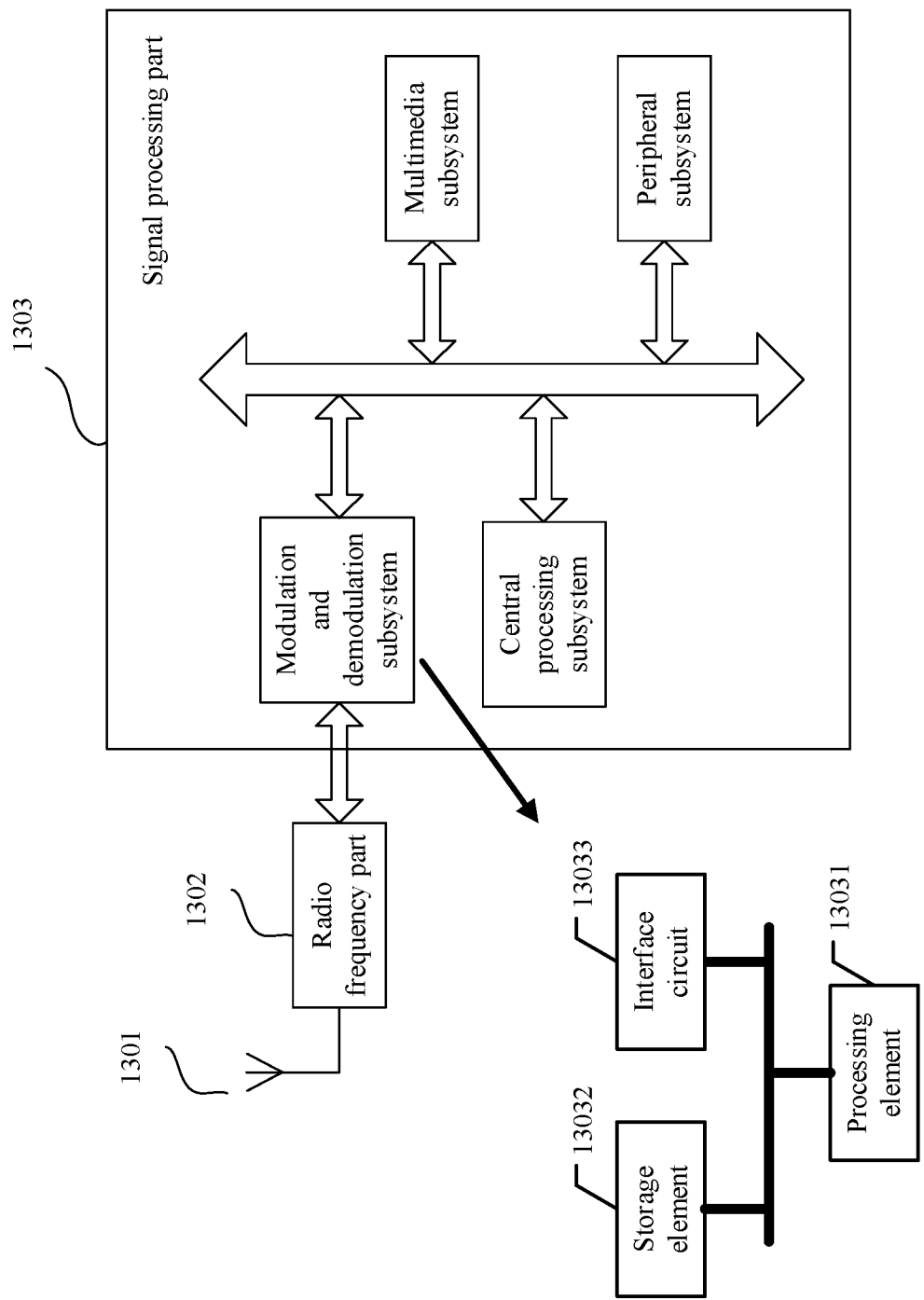
FIG. 13 is a schematic structural diagram of a terminal according to this application.

FIG. 13 is a schematic structural diagram of a terminal according to an embodiment of this application. The terminal may be the terminal in the foregoing embodiments, and is configured to implement the operations of the terminal in the foregoing embodiments. As shown in FIG. 13, the terminal includes an antenna 1301, a radio frequency part 1302, and a signal processing part 1303. The antenna 1301 is connected to the radio frequency part 1302. In a downlink direction, the radio frequency part 1302 receives, by using the antenna 1301, information sent by a network device, and sends, to the signal processing part 1303 for processing, the information sent by the network device. In an uplink direction, the signal processing part 1303 processes information of the terminal and sends the processed information of the terminal to the radio frequency part 1302, and the radio frequency part 1302 processes the processed information of the terminal and then sends processed information of the terminal to the network device by using the antenna 1301.

The signal processing part 1303 may include a modulation and demodulation subsystem, configured to process data at each communications protocol layer, and may further include a central processing subsystem, configured to function as an operating system and an application layer of the terminal. In addition, the signal processing part 1303 may further include other subsystems, for example, a multimedia subsystem and a peripheral subsystem. The multimedia subsystem is configured to control a terminal camera, screen display, and the like. The peripheral subsystem is configured to implement connection to another device. The modulation and demodulation subsystem may be a separately disposed chip. Optionally, the foregoing apparatus used for the terminal may be located in the modulation and demodulation subsystem.

The modulation and demodulation subsystem may include one or more processing elements 13031, for example, include a main control CPU and another integrated circuit. In addition, the modulation and demodulation subsystem may further include a storage element 13032 and an interface circuit 13033. The storage element 13032 is configured to store data and a program. However, a program used to perform the methods performed by the terminal in the foregoing methods may not necessarily be stored in the storage element 13032, but may be stored in a memory outside the modulation and demodulation subsystem and is loaded by the modulation and demodulation subsystem for use when being used. The interface circuit 13033 is configured to communicate with another subsystem. The foregoing apparatus used for the terminal may be located in the modulation and demodulation subsystem. The modulation and demodulation subsystem may be implemented by using a chip. The chip includes at least one processing element and an interface circuit. The processing element is configured to perform steps of any one of the foregoing methods performed by the terminal. The interface circuit is configured to communicate with another apparatus. In an implementation, units for implementing the steps in the foregoing methods in the terminal each may be implemented in a form of a program invoked by a processing element. For example, the apparatus applied to the terminal includes a processing element and a storage element, and the processing element invokes a program stored in the storage element, to perform the methods performed by the terminal in the foregoing method embodiments. The storage element may be a storage element located on a same chip as the processing element, namely, an on-chip storage element.

In another implementation, the program used to perform the methods performed by the terminal in the foregoing methods may be in a storage element located on a different chip from the processing element, namely, an off-chip storage element. In this case, the processing element invokes or loads the program from the off-chip storage element to an on-chip storage element, to invoke and perform the methods performed by the terminal in the foregoing method embodiments.

In still another implementation, units for implementing the steps in the foregoing methods in the apparatus applied to the terminal each may be configured as one or more processing elements. These processing elements are disposed in the modulation and demodulation subsystem. The processing elements herein may be integrated circuits, for example, one or more ASICs, one or more DSPs, one or more FPGAs, or a combination of these types of integrated circuits. These integrated circuits may be integrated together to form a chip.

Units for implementing the steps in the foregoing methods in the terminal may be integrated together and implemented in a form of a system-on-a-chip (SOC). The SOC chip is configured to implement the foregoing methods. At least one processing element and a storage element may be integrated into the chip, and the processing element invokes a program stored in the storage element, to implement the foregoing methods performed by the terminal. Alternatively, at least one integrated circuit may be integrated into the chip, and configured to implement the foregoing methods performed by the terminal. Alternatively, with reference to the foregoing implementations, functions of some units may be implemented in a form of a program invoked by a processing element, and functions of some units may be implemented in a form of an integrated circuit.

It can be learned that, the foregoing apparatus applied to the terminal may include at least one processing element and an interface circuit, and the at least one processing element is configured to perform any one of the methods performed by the terminal according to the foregoing method embodiments. The processing element may perform, in manner 1, that is, by invoking a program stored in a storage element, some or all of the steps performed by the terminal; or may perform, in manner 2, that is, by combining a hardware integrated logical circuit in the processor element with an instruction, some or all of the steps performed by the terminal. Certainly, the processing element may perform, by combining manner 1 and manner 2, some or all of the steps performed by the terminal.

As described above, the processing element herein may be a general purpose processor, for example, a CPU, or may be one or more integrated circuits configured to implement the foregoing methods, for example, one or more ASICs, one or more microprocessors DSPs, one or more FPGAs, or a combination of at least two of these integrated circuit forms.

The storage element may be a memory, or may be a general term of a plurality of storage elements.

Figure 14:
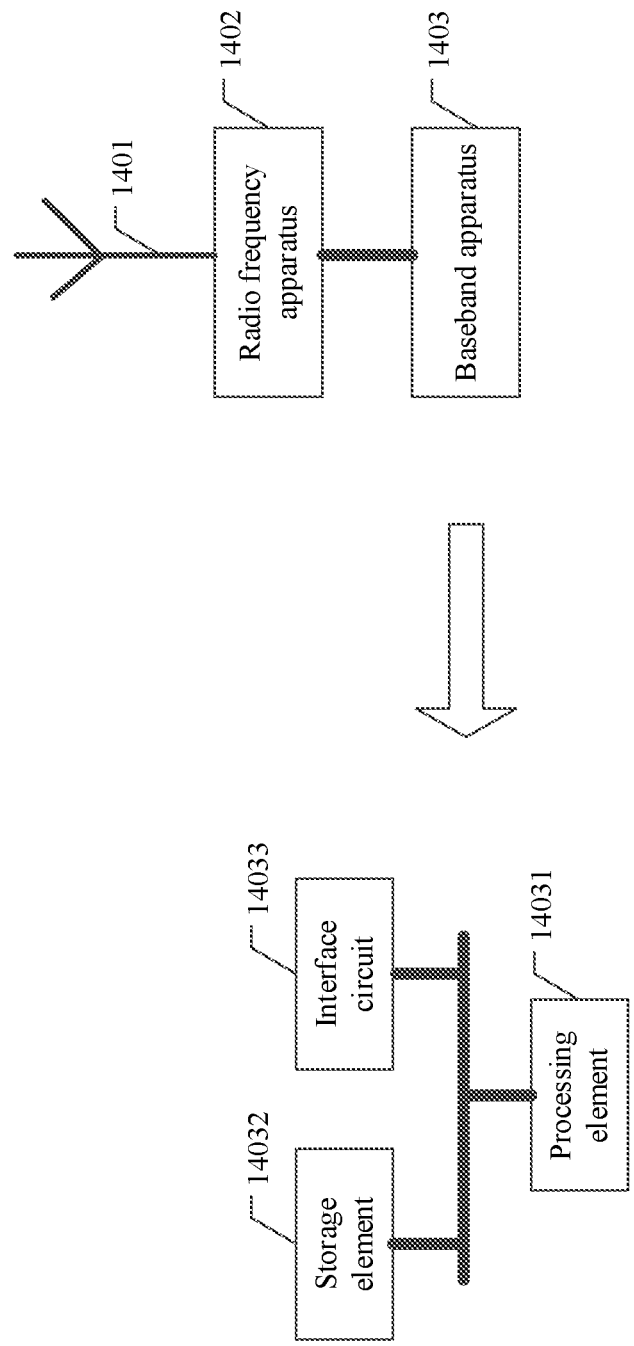
FIG. 14 is a schematic structural diagram of a network device according to this application.

FIG. 14 is a schematic structural diagram of a network device according to an embodiment of this application. The network device is configured to implement the operations of the network device in the foregoing embodiments. As shown in FIG. 14, the network device includes an antenna 1401, a radio frequency apparatus 1402, and a baseband apparatus 1403. The antenna 1401 is connected to the radio frequency apparatus 1402. In an uplink direction, the radio frequency apparatus 1402 receives, by using the antenna 1401, information sent by a terminal, and sends, to the baseband apparatus 1403 for processing, the information sent by the terminal. In a downlink direction, the baseband apparatus 1403 processes information of the network device and sends processed information of the network device to the radio frequency apparatus 1402, and the radio frequency apparatus 1402 processes the processed information of the network device and then sends processed information of the network device to the terminal by using the antenna 1401.

The baseband apparatus 1403 may include one or more processing elements 14031, for example, include a main control CPU and another integrated circuit. In addition, the baseband apparatus 1403 may further include a storage element 14032 and an interface circuit 14033. The storage element 14032 is configured to store a program and data. The interface circuit 14033 is configured to exchange information with the radio frequency apparatus 1402. The interface circuit is, for example, a common public radio interface (CPRI). The foregoing apparatus applied to the network device may be located in the baseband apparatus 1403. For example, the foregoing apparatus applied to the network device may be a chip in the baseband apparatus 1403. The chip includes at least one processing element and an interface circuit. The processing element is configured to perform steps of any one of the foregoing methods performed by the network device. The interface circuit is configured to communicate with another apparatus. In an implementation, units for implementing the steps in the foregoing methods in the network device each may be implemented in a form of a program invoked by a processing element. For example, the apparatus applied to the network device includes a processing element and a storage element, and the processing element invokes a program stored in the storage element, to perform the methods performed by the network device in the foregoing method embodiments. The storage element may be a storage element located on a same chip as the processing element, namely, an on-chip storage element, or may be a storage element located on a different chip from the processing element, namely, an off-chip storage element.

In another implementation, units for implementing the steps in the foregoing methods in the apparatus applied to the network device each may be configured as one or more processing elements. These processing elements are disposed in the baseband apparatus. The processing elements herein may be integrated circuits, for example, one or more ASICs, one or more DSPs, one or more FPGAs, or a combination of these types of integrated circuits. These integrated circuits may be integrated together to form a chip.

Units for implementing the steps in the foregoing methods in the network device may be integrated together and implemented in a form of a system-on-a-chip (SOC). For example, the baseband apparatus includes the SOC chip, and is configured to implement the foregoing methods. At least one processing element and a storage element may be integrated into the chip, and the processing element invokes a program stored in the storage element, to implement the foregoing methods performed by the network device. Alternatively, at least one integrated circuit may be integrated into the chip, and configured to implement the foregoing methods performed by the network device. Alternatively, with reference to the foregoing implementations, functions of some units may be implemented in a form of a program invoked by a processing element, and functions of some units may be implemented in a form of an integrated circuit.

It can be learned that, the foregoing apparatus applied to the network device may include at least one processing element and an interface circuit, and the at least one processing element is configured to perform any one of the methods performed by the network device according to the foregoing method embodiments. The processing element may perform, in manner 1, that is, by invoking a program stored in a storage element, some or all of the steps performed by the network device; or may perform, in manner 2, that is, by combining a hardware integrated logical circuit in the processor element with an instruction, some or all of the steps performed by the network device. Certainly, the processing element may perform, by combining manner 1 and manner 2, some or all of the steps performed by the network device.

As described above, the processing element herein may be a general purpose processor, for example, a CPU, or may be one or more integrated circuits configured to implement the foregoing methods, for example, one or more ASICs, one or more microprocessors DSPs, one or more FPGAs, or a combination of at least two of these integrated circuit forms.

The storage element may be a memory, or may be a general term of a plurality of storage elements.

Figure 15:
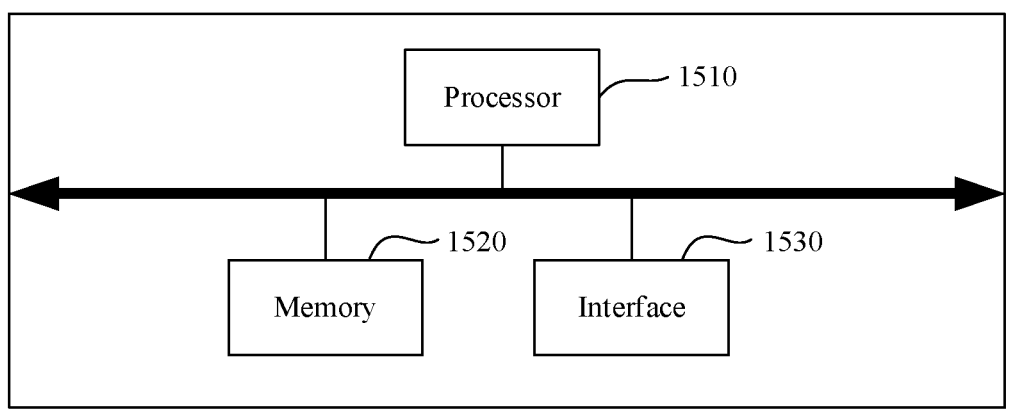
FIG. 15 is a schematic structural diagram of another network device according to this application.

FIG. 15 is a schematic structural diagram of another network device according to an embodiment of this application. The network device may be the network device in the foregoing embodiments, and is configured to implement the operations of the network device in the foregoing embodiments.

As shown in FIG. 15, the network device includes a processor 1510, a memory 1520, and an interface 1530, and the processor 1510, the memory 1520, and the interface 1530 are connected by using data signals.

The foregoing reference time determining apparatus is located in the network device, and a function of each unit may be implemented by the processor 1510 by invoking a program stored in the memory 1520. In other words, the foregoing reference time determining apparatus includes a memory and a processor, and the memory is configured to store a program, where the program is invoked by the processor to perform the method in the foregoing method embodiments. The processor herein may be an integrated circuit that has a signal processing capability, for example, a CPU. Alternatively, functions of the foregoing units may be implemented by being configured as one or more integrated circuits for implementing the foregoing method, for example, one or more ASICs, one or more microprocessors DSPs, one or more FPGAs, or a combination of at least two of these integrated circuit forms. Alternatively, the foregoing implementations may be combined.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or the block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided to a processor of a general-purpose computer, a dedicated computer, an embedded processor, or another programmable data processing device to generate a machine, so that the instructions executed by a processor of a computer or another programmable data processing device generate an apparatus configured to implement a specific function in one or more processes in the flowcharts and/or in one or more blocks in the block diagrams.

These computer program instructions may alternatively be stored in a computer-readable memory that can instruct the computer or another data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

It is clear that a person skilled in the art can make various modifications and variations to this application without departing from the spirit and scope of this application. In this way, if these modifications and variations to this application fall within the scope of the claims of this application and their equivalent technologies, this application is also intended to cover these modifications and variations.

What is claimed is:

1. A reference time determining method, wherein the method comprises:
   receiving, by a terminal, a plurality of pieces of time reference information from a network device;
   receiving, by the terminal, indication information from the network device, wherein the indication information indicates first time reference information, and the plurality of pieces of time reference information comprise the first time reference information; and
   determining, by the terminal, the first time reference information based on the indication information, and determining a reference time of the terminal based on the first time reference information.

2. The method according to claim 1, wherein time reference information in the plurality of pieces of time reference information indicates a reference time of a control device.

3. The method according to claim 2, wherein the time reference information comprises a reference time information element and an identification information element; and
   the identification information element comprises device information of the control device, identification information of a clock, or an index of the time reference information.

4. The method according to claim 1, wherein time reference information in the plurality of pieces of time reference information indicates a time offset between a reference time of a control device and a reference time of the network device.

5. The method according to claim 4, further comprising:
receiving, by the terminal, time reference information of the network device, wherein the time reference information of the network device indicates the reference time of the network device.

6. The method according to claim 5, wherein the determining, by the terminal, a reference time of the terminal based on the first time reference information comprises:
determining, by the terminal, the reference time of the terminal based on the first time reference information and the time reference information of the network device.

7. The method according to claim 4, wherein the time reference information comprises a time offset information element and an identification information element; and
the identification information element comprises device information of the control device, identification information of a clock, or an index of the time reference information.

8. The method according to claim 1, wherein the plurality of pieces of time reference information and the indication information are in a same message.

9. The method according to claim 1, wherein the indication information comprises device information of a first control device, identification information of a first clock, or an index of the first time reference information.

10. A reference time determining apparatus, comprising:
a processor; and
a computer-readable storage medium coupled to the processor and storing programming instructions for execution by the processor, the programming instructions cause the processor to:
receive a plurality of pieces of time reference information from a network device, and receive indication information from the network device, wherein the indication information indicates first time reference information, and the plurality of pieces of time reference information comprise the first time reference information; and
determine the first time reference information based on the indication information, and determine a reference time of a terminal based on the first time reference information.

11. The apparatus according to claim 10, wherein time reference information in the plurality of pieces of time reference information indicates a reference time of a control device.

12. The apparatus according to claim 11, wherein the time reference information comprises a reference time information element and an identification information element; and
the identification information element comprises device information of the control device, identification information of a clock, or an index of the time reference information.

13. The apparatus according to claim 10, wherein time reference information in the plurality of pieces of time reference information indicates a time offset between a reference time of a control device and a reference time of the network device.

14. The apparatus according to claim 13, wherein the programming instructions further cause the processor to:
receive time reference information of the network device, wherein the time reference information of the network device indicates the reference time of the network device.

15. The apparatus according to claim 14, wherein when determining the reference time of the terminal based on the first time reference information, the programming instructions further cause the processor to:
determine the reference time of the terminal based on the first time reference information and the time reference information of the network device.

16. The apparatus according to claim 13, wherein the time reference information comprises a time offset information element and an identification information element; and
the identification information element comprises device information of the control device, identification information of a clock, or an index of the time reference information.

17. The apparatus according to claim 10, wherein the plurality of pieces of time reference information and the indication information are in a same message.

18. The apparatus according to claim 10, wherein the indication information comprises device information of a first control device, identification information of a first clock, or an index of the first time reference information.

* * * * *